United States Patent
Yoon et al.

(10) Patent No.: US 10,175,804 B2
(45) Date of Patent: Jan. 8, 2019

(54) ELECTRONIC DEVICE HAVING FORCE TOUCH FUNCTION

(71) Applicant: LG Display Co., Ltd., Seoul (KR)

(72) Inventors: SeungHwan Yoon, Seoul (KR); KiDuk Kim, Paju-si (KR); JongHee Hwang, Goyang-si (KR); DongKyun Lim, Goyang-si (KR); EunJung Kim, Seoul (KR)

(73) Assignee: LG Display Co., Ltd., Seoul (KR)

(*) Notice: Subject to any disclaimer, the term of this patent is extended or adjusted under 35 U.S.C. 154(b) by 204 days.

(21) Appl. No.: 14/982,841

(22) Filed: Dec. 29, 2015

(65) Prior Publication Data
US 2017/0090637 A1 Mar. 30, 2017

(30) Foreign Application Priority Data

Sep. 30, 2015 (KR) .................. 10-2015-0137905

(51) Int. Cl.
*G06F 3/041* (2006.01)
*H04M 1/02* (2006.01)

(52) U.S. Cl.
CPC ........ *G06F 3/0414* (2013.01); *H04M 1/0266* (2013.01); *H04M 2201/38* (2013.01); *H04M 2250/22* (2013.01)

(58) Field of Classification Search
CPC .................................................. G06F 3/0414
See application file for complete search history.

(56) References Cited

U.S. PATENT DOCUMENTS

| | | | |
|---|---|---|---|
| 5,854,625 A | 12/1998 | Frisch et al. | |
| 2010/0024573 A1* | 2/2010 | Daverman | G01L 1/142 73/862.626 |
| 2011/0248952 A1 | 10/2011 | Wang et al. | |
| 2014/0055407 A1 | 2/2014 | Lee et al. | |
| 2015/0268827 A1 | 9/2015 | Kim et al. | |
| 2016/0062500 A1* | 3/2016 | Kessler | G06F 3/0414 345/174 |
| 2016/0062504 A1* | 3/2016 | Hwang | G06F 3/0412 345/174 |

FOREIGN PATENT DOCUMENTS

| KR | 10-2014-0026934 | 3/2014 |
|---|---|---|
| WO | WO 2015/123322 A1 | 8/2015 |

* cited by examiner

*Primary Examiner* — Robin Mishler
(74) *Attorney, Agent, or Firm* — Fenwick & West LLP

(57) ABSTRACT

An electronic device has a force touch function. The electronic device includes an image display module having a touch electrode. A cover window attaches to a front surface of the image display module. A housing receives the image display module therein, and supports the cover window. A panel moving part is between the housing and the image display module. A driving circuit senses a touch force based on a distance between the image display module and the housing which are spaced from each other with the panel moving part interposed in-between.

23 Claims, 11 Drawing Sheets

ELECTRONIC DEVICE HAVING FORCE TOUCH FUNCTION

CROSS REFERENCE TO RELATED APPLICATIONS

This application claims the benefit of the Korean Patent Application No. 10-2015-0137905 filed on Sep. 30, 2015, which is hereby incorporated by reference as if fully set forth herein.

BACKGROUND

Field of the Disclosure

Embodiments relate to an electronic device having a force touch function.

Discussion of the Related Art

A touch screen device is a type of input device that allows a user to input information through a screen contact of a display device without an additional input device in electronic devices. The touch screen device is generally used as the input device for various kinds of products such as television, notebook computer and monitor as well as portable electronic devices such as electronic notebook, electronic book (e-book), PMP (Portable Multimedia Player), navigation, UMPC (Ultra Mobile PC), mobile phone, smart phone, smart watch, tablet PC (tablet Personal Computer), watch phone, and mobile communication terminal.

Recently, with an establishment of a user interface environment such as application which requires touch information for a force touch, an electronic device having a force touch function for sensing a touch force has been developed and studied.

For example, Korean Patent Publication Number P10-2014-0026934 discloses a touch display device which senses a touch force by the use of sensing electrodes made of a piezoresistive material whose resistance value is changed in accordance with an applied touch force.

However, since a related art display device senses a touch force through a resistance change of piezoresistive material, it is difficult to sense a touch force with a touch pressure above a predetermined threshold value.

Also, a touch processor is connected by a one-to-one correspondence to each of the sensing electrodes, whereby the number of electrode channels is increased, and thus a data processing time is also increased. In case of the related art touch display device, a touch screen panel is disposed on a display panel, whereby the touch screen panel may be damaged by an external impact.

SUMMARY

Accordingly, embodiments are directed to an electronic device having a force touch function that substantially obviate one or more problems due to limitations and disadvantages of the related art.

An aspect of an embodiment is directed to provide an electronic device having a force touch function which is capable of sensing a touch force. In a particular embodiment, the electronic device includes an image display module having a touch electrode. A cover window attaches to a front surface of the image display module. A housing receives the image display module therein, and supports the cover window. A panel moving part is between the housing and the image display module. A driving circuit senses a touch force based on a distance between the image display module and the housing which are spaced from each other with the panel moving part interposed in-between.

In a particular embodiment, an electronic device comprises an image display module, a cover window, a housing, and a touch driver circuit. The image display module comprises a display panel to display an image in response to an image signal and a touch sensing circuit to sense a position of a touch by detecting a change in capacitance of a touch electrode in response to a force applied to the front surface of the image display module. A cover window is attached to a front surface of the image display module. A housing comprises a housing plate covering a rear surface of the image display module and sidewalls covering lateral surfaces of the image display module and supporting the cover window. The housing supports the image display module such that a gap exists between the housing plate and the rear surface of the image display module. The touch driver circuit senses a change in mutual capacitance across at least a portion of the gap between the housing plate and the rear surface of the image display module caused by a change in size of the gap in response to the force and generates force data estimating the force applied to the image display module.

Additional advantages and features of embodiments will be set forth in part in the description which follows and in part will become apparent to those having ordinary skill in the art upon examination of the following or may be learned from practice of embodiments. The objectives and other advantages of embodiments may be realized and attained by the structure particularly pointed out in the written description and claims hereof as well as the appended drawings.

It is to be understood that both the foregoing general description and the following detailed description of embodiments are exemplary and explanatory and are intended to provide further explanation of the invention as claimed.

BRIEF DESCRIPTION OF THE DRAWINGS

The accompanying drawings, which are included to provide a further understanding of the embodiments and are incorporated in and constitute a part of this application, illustrate embodiment(s) and together with the description serve to explain the principle of the disclosed embodiments. In the drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a display device will be described in detail with reference to the accompanying drawings. Wherever possible, the same reference numbers will be used throughout the drawings to refer to the same or like parts. Also, in the following description, if detailed description of elements or functions known is determined to make the subject matter unnecessarily obscure, the detailed description will be omitted.

Hereinafter, an electronic device having a force touch function will be described with reference to the accompanying drawings.

Figure 1:
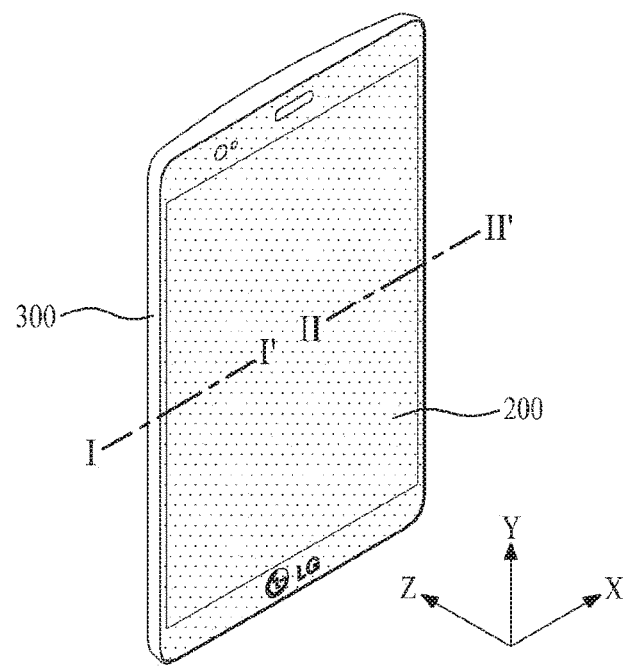
FIG. 1 is a perspective view illustrating an electronic device having a force touch function according to one embodiment.
Figure 2:
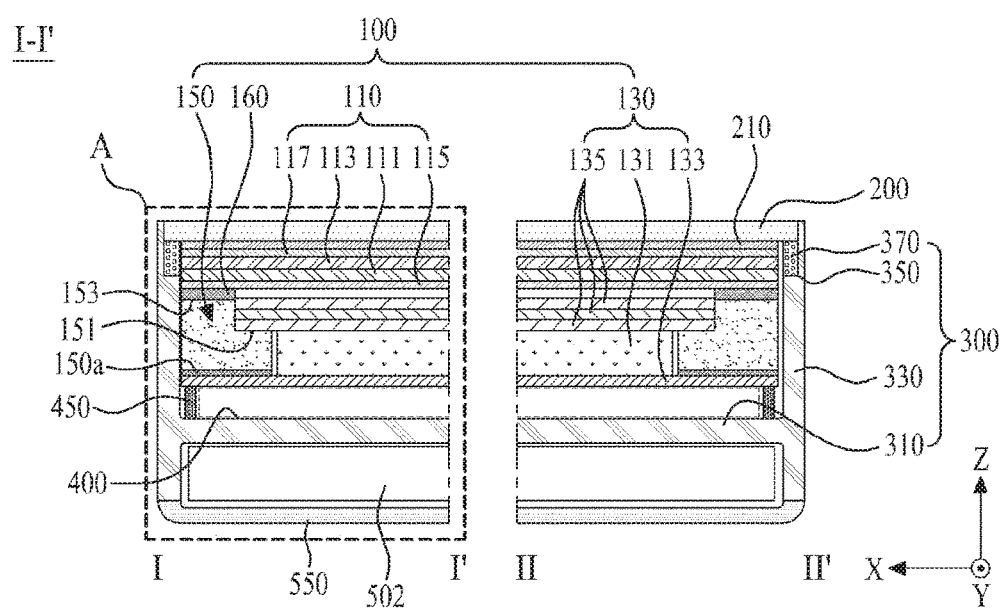
FIG. 2 is a cross sectional view along I-I' and II-II' of FIG. 1.
Figure 3:
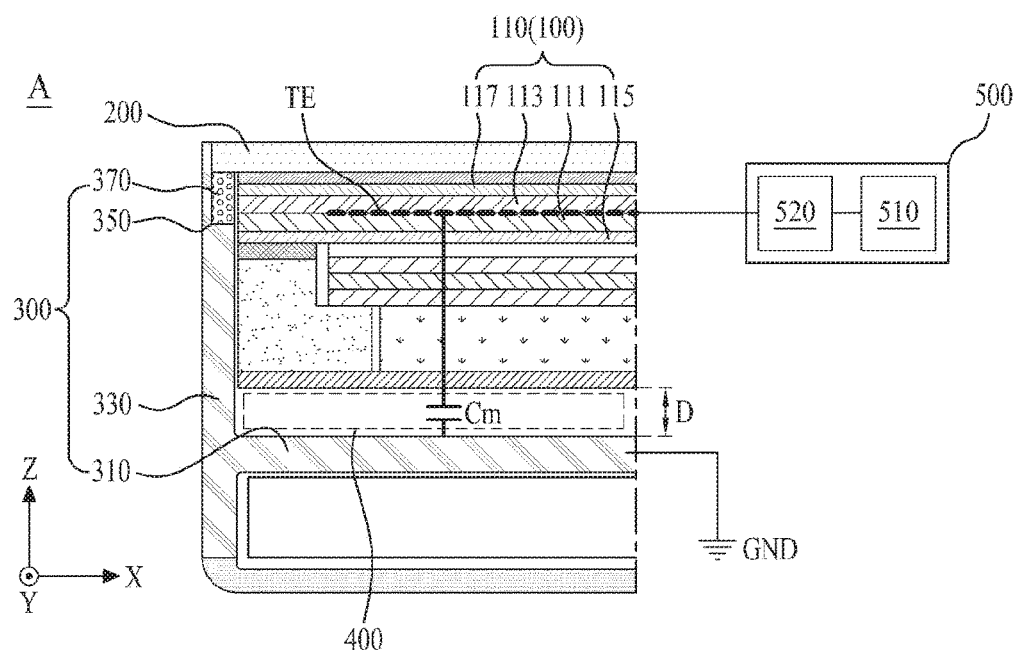
FIG. 3 is a partial expanded view of 'A' portion of FIG. 2.

FIG. 1 is a perspective view illustrating an electronic device having a force touch function according to one embodiment. FIG. 2 is a cross sectional view along I-I' and of FIG. 1. FIG. 3 is a partial expanded view of 'A' portion of FIG. 2. For the following description, an electronic device having a force touch function will be referred to as 'electronic device'.

Referring to FIGS. 1 to 3, the electronic device according to this embodiment may include an image display module 100, a cover window 200, a housing 300, a panel moving part 400, and a driving circuit 500.

The image display module 100 displays an image corresponding to a video signal supplied from the driving circuit 500, or senses a touch position for a user's touch. For a display mode, the image display module 100 displays an image corresponding to a video signal supplied form the driving circuit 500. For a touch sensing mode, the image display module 100 is driven in a touch mode of sensing a touch position for a user's touch.

The image display module 100 according to an example may include a display panel 110, a backlight unit 130, and a guide frame 150.

The display panel 110 may be a liquid crystal display panel on which an image is displayed by driving liquid crystal molecules. The display panel 100 may include a lower substrate 111 and an upper substrate 113 bonded to each other with a liquid crystal layer interposed in-between. A predetermined image is displayed on the display panel 110 by the use of light emitted from the backlight unit 130.

The lower substrate 111 is a thin film transistor array substrate. On the lower substrate 111, there are a plurality of pixels (not shown) provided every pixel region defined by crossing a plurality of gate lines (not shown) and a plurality of data lines (not shown). Each pixel may include a thin film transistor (not shown) connected with the gate and data lines, a pixel electrode connected with the thin film transistor, and a common electrode provided close to the pixel electrode and supplied with a common voltage.

A pad (not shown), which is connected with each signal line, is prepared in a lower edge of the lower substrate 111. The pad is connected with the driving circuit 500. Also, a gate driving circuit (not shown) for driving the gate line of the display panel 110 may be prepared in a left and/or right edge of the lower substrate 111. In this case, the gate driving circuit is connected with each gate line, and is manufactured for a process of forming the thin film transistor of each pixel. The gate driving circuit generates a gate signal sequentially shifted in accordance with a gate control signal supplied from the driving circuit 500, and supplies the generated gate signal to the corresponding gate line.

The upper substrate 113 may include a pixel-defining pattern for defining an opening region overlapped with each pixel region of the lower substrate 111, and a color filter formed in the opening region. The upper substrate 113, which confronts the lower substrate 111, is bonded to the lower substrate 111 by the use of sealant, wherein the liquid crystal layer is interposed between the lower substrate 111 and the upper substrate 113. Accordingly, an entire area of the lower substrate 111 except the pad is covered by the upper substrate 113.

An alignment film (not shown) for aligning a pretilt angle of liquid crystal is provided on at least any one of the lower substrate 111 and the upper substrate 113. The liquid crystal layer is interposed between the lower substrate 111 and the upper substrate 113. The liquid crystal layer includes liquid crystal molecules which are horizontally aligned in an in-plane mode electric field formed by common and data voltages applied to the pixel electrode every pixel.

A lower polarizing member 115 having a first polarizing axis is attached to a rear surface of the lower substrate 111, and an upper polarizing member 117 having a second polarizing axis which is perpendicular to the first polarizing axis is attached to a front surface of the upper substrate 113.

For the touch sensing mode, the common electrode is used as a touch electrode (TE) in the display panel 110. For the display mode, the common electrode together with the pixel electrode is used as a liquid crystal driving electrode in the display panel 110. That is, the display panel 110 may be an in-cell touch type liquid crystal display panel, and more particularly, a self capacitive in-cell touch type liquid crystal display panel. For example, the in-cell touch type liquid crystal display panel may be a liquid crystal display panel in a liquid crystal display device with a touch sensor, which is disclosed in Korean Patent Publication Number P10-2013-0015584, but not limited to this type.

The backlight unit 130 is disposed below the display panel 110, wherein the backlight unit 130 emits light toward the display panel 110. The backlight unit 130 according to an example may include a light guiding plate 131, a light source (not shown), a reflective sheet 133, and an optical sheet 135.

The light guiding plate 131 includes a light-incidence portion prepared at least any one side thereof. The light guiding plate 131 advances light, which is incident on the light-incidence portion, toward an upper direction, that is, toward the display panel 110.

The light source faces the light-incidence portion of the light guiding plate 131, wherein the light source emits light to the light-incidence portion of the light guiding plate 131. The light source according to an example may include a printed circuit board disposed close to the light-incidence portion of the light guiding plate 131, and a plurality of light emission diode packages provided on the printed circuit board.

The reflective sheet 133 is provided inside the housing 300, and the reflective sheet 133 covers the rear of the light guiding plate 131. The reflective sheet 133 reflects the light, which is incident through a lower surface of the light guiding plate 131, toward the inside of the light guiding plate 131, to thereby minimize a loss of the light. Also, the reflective sheet 133 radiates both heat generated when the light source is driven and heat generated in the light guiding plate 131 by the heat toward the housing 300.

Additionally, the reflective sheet 133 may support the guide frame 150. In this case, the reflective sheet 133 further includes an expanding region which is overlapped with a lower surface of the guide frame 150 at each side. The expanding region of the reflective sheet 133 may be connected with the lower surface of the guide frame 150 by the use of adhesion member 150*a*. The adhesion member 150*a* may include a double-sided tape.

The optical sheet 135 is disposed on the light guiding plate 131, wherein the optical sheet 135 improves luminance properties of the light guided by the light guiding plate 131. For example, the optical sheet 135 may include a diffusion sheet, a prism sheet, and a dual brightness enhancement film, but not limited to this structure. The optical sheet 135 may be formed in a deposition structure of two or more elements selected among a diffusion sheet, a prism sheet, a dual brightness enhancement film, and a lenticular sheet.

Additionally, the image display module 100 may further include a viewing angle control film (not shown) for controlling a viewing angle of the display panel 110 within a predetermined range, wherein the viewing angle control film (not shown) may be disposed between the display panel 110 and the optical sheet 135.

The guide frame 150 is formed in a rectangular band shape, and the guide frame 150 is attached to the edge of a rear surface of the display panel 110. The guide frame 150 surrounds each lateral surface of the backlight unit 130, to thereby minimize a movement of the backlight unit 130. The guide frame 150 according to an example may include a sheet supporter 151 and a panel supporter 153.

The sheet supporter 151 is formed in a rectangular band while being overlapped with the edge of the backlight unit 130, that is, the edge of the optical sheet 135, whereby the edge of the optical sheet 135 is supported by the sheet supporter 151. A lower surface of the sheet supporter 151 may be attached to the expanding region of the reflective sheet 133 by the use of adhesion member 150*a*.

Additionally, the sheet supporter 151 may further include a light guiding plate supporter (not shown) which protrudes out of an inner surface of the sheet supporter 151 and overlaps with the light guiding plate 131. The light guiding plate supporter supports the edge of the lower surface of the light guiding plate 131.

The panel supporter 153, which protrudes out of the edge of an upper surface of the sheet supporter 151, is formed in a rectangular band. The panel supporter 153 is attached to the edge of a rear surface of the display panel 110 through the use of panel adhesion member 160. In this case, the panel adhesion member 160 may include a double-sided tape, a thermal-curing resin, a photo-curing resin, or a double-sided adhesive foam pad.

The guide frame 150, which is attached to the display panel 110, supports the backlight unit 130, whereby the backlight unit 130 is suspended from a rear surface of the display panel 110.

The cover window 200, which is attached to an entire front surface of the display panel 110, is supported by the housing 300, thereby supporting the image display module 100. In this case, the cover window 200 is movably supported by the housing 300. The cover window 200 is attached to the display panel 110, and more particularly, to an entire front surface of the upper polarizing member 117 by the use of transparent adhesive member 210, thereby supporting the display panel 110 and protecting the display panel 110 from an external impact. In this case, the transparent adhesive member 210 may include OCA (Optical Clear Adhesive) or OCR (Optical Clear Resin).

The cover window 200 according to an example may include a tempered glass, a transparent plastic, or a transparent film. According to an example, the cover window 200 may include at least any one of sapphire glass and gorilla glass. According to another example, the cover window 200 may include any one among PET (polyethyleneterephthalate), PC (polycarbonate), PES (polyethersulfone), PEN (polyethylenapthanate), and PNB (polynorborneen). In consideration of scratches and transparency, the cover window 200 may include the tempered glass, preferably.

The housing 300 receives the image display module 100 therein, and also supports the cover window 200. That is, the housing 300 covers each lateral surface and the rear surface of the image display module 100 attached to the cover window 200.

The housing 300 according to an example has a space defined by a housing plate 310 and a housing sidewall 320. The housing 300 may be formed in a case shape whose upper surface is opened. The housing 300 may include a conductive material. For example, the housing 300 may include an aluminum (Al) material, an invar material, or a magnesium (Mg) material. The housing 300 is electrically grounded (GND).

The housing plate 310 corresponds to a bottom surface of the space, that is, the housing plate 310 covers a rear surface of the backlight unit 130.

At least one of system receiving space may be prepared at a rear surface of the housing plate 310. In the system receiving space, there are a driving circuit 500 of the electronic device, a battery 502 for supplying a driving power, a communication module (not shown), a power circuit (not shown), and a memory (not shown). This system receiving space is covered by a rear cover 550. For replacement of the battery 502, the rear cover 500 may be detachably connected with the rear surface of the housing 300, but not necessary. If using the electronic device with the internal-type battery 502, the rear cover 500 may be fixedly connected with the rear surface of the housing 300.

The housing sidewall 330 is perpendicular to each lateral surface of the housing plate 310. The housing sidewall 330 supports the cover window 200, whereby each lateral surface of the image display module 100 attached to the cover window 200 is covered by the housing sidewall 330. In this case, an upper side of the housing sidewall 330 covers each lateral surface of the cover window 200.

A height of the housing sidewall 330 is larger than an entire height (or thickness) of the image display module 100, whereby the image display module 100 attached to the cover window 200 is provided at a predetermined interval from the housing plate 310.

The housing sidewall 330 has a groove 350 prepared in an upper internal surface thereof, and an impact-absorbing member 370 is provided in the groove 350. The impact-absorbing member 370 is disposed between the cover window 200 and the housing sidewall 330, and is attached to the groove 350, whereby the cover window 200 is moved in an up-and-down direction (Z) by a user's touch pressure. The impact-absorbing member 370 may include an impact-absorbing pad or a double-sided adhesive foam pad.

In one embodiment, a gap exists between the housing plate 310 and the rear surface of the image display module 100, and the size of the gap changes with the touch force. The panel moving part 400 is prepared between the rear surface of the image display module 100 and the housing 300, which provides the space in which the image display module 100 is capable of being moved in the up-and-down direction (Z) in accordance with a user's touch pressure. That is, the panel moving part 400 may be defined by the space or an air gap provided between the housing plate 310 and the rear surface of the image display module 100 provided at a predetermined interval from the housing plate 310 by the height of the housing sidewall 330.

Figure 4:
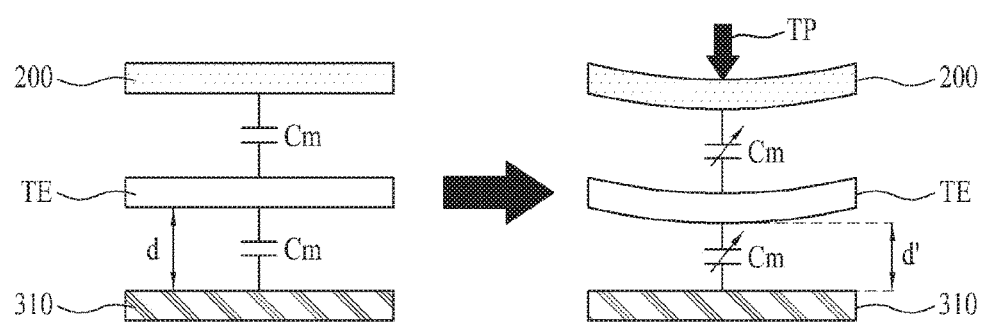
FIG. 4 shows a change of capacitance in accordance with a touch pressure.

As shown in FIGS. 2 to 4, in circuit, the panel moving part 400 corresponds to a mutual capacitance (Cm) across the gap. For example, in the embodiment of FIG. 3, the mutual capacitance is formed between the housing plate 310 and the touch electrode (TE) prepared in the display panel 110. The mutual capacitance (Cm) is increased according as a distance (d) between the touch electrode (TE) and the housing plate 310 is decreased. That is, the change of mutual capacitance (Cm) is in inverse proportion to the change of distance (d'). Thus, according as the display panel 110 is bent by a touch pressure applied to the cover window 200, the display panel 110 becomes close to the panel moving part 400, whereby the distance (d') between the touch electrode (TE) and the housing plate 310 is decreased, and thus the change of mutual capacitance (Cm) is increased. In order to improve sensitivity to a force touch, the distance (D) between the housing plate 310 and the rear surface of the image display module 100 is at least 500 um or more, preferably, under the condition that the touch pressure is not applied to the cover window 200. If the distance (D) between the housing plate 310 and the rear surface of the image display module 100 is less than 500 um, the change of mutual capacitance (Cm) is not shown or imperceptible by the relatively-strong touch pressure, thereby degrading the sensitivity.

Additionally, the electronic device according to this embodiment may further include a module supporter 450.

The module supporter 450 is disposed in the edge of the rear surface of the image display module 100, and more particularly, between the edge of a rear surface of the reflective sheet 133 and the housing plate 310, to thereby support the edge of the rear surface of the reflective sheet 133. That is, the module supporter 450 supports the edge of the rear surface of the image display module 100 without interrupting the image display module 100 bent by a user's touch force, to thereby prevent the image display module 100 from being separated from the cover window 200.

The module supporter 450 according to an example may include an impact-absorbing pad or a double-sided adhesive foam pad. In this case, the module supporter 450 may include a hollow (or disconnecting portion), wherein the hollow enables a communication between the inside and outside of the module moving part 400 surrounded by the module supporter 450 so that the image display module 100 is capable of being bent by a user's touch force. That is, if the module moving part 400 is formed of a space sealed by the module supporter 450, the image display module 100 may not be bent by a user's touch force. Accordingly, it is needed to provide the hollow which does not seal the module moving part 400 so as to provide the image display module 100 being bent toward the module moving part 400 by a user's touch force.

The driving circuit 500 is provided in the pad prepared in the lower substrate 113, wherein the driving circuit 500 time-divides the display panel 100 by a display mode and a touch mode. For the display mode, the driving circuit 500 displays an image on the display panel 110. For the touch mode, the driving circuit 500 senses a user's touch and/or force touch through the use of touch electrode (TE), calculates a touch position and/or touch force, and executes an application corresponding to the calculated touch position and/or touch force.

The driving circuit 500 according to an example may include a host controller 510 and a driving integrated circuit 520.

Figure 5:
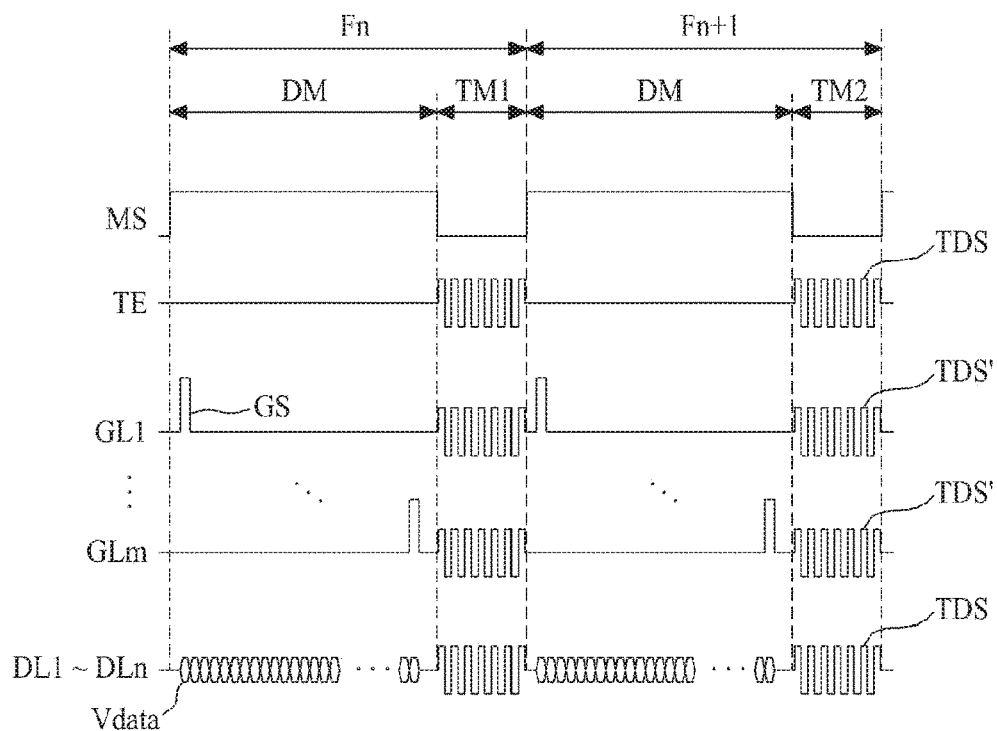
FIG. 5 is a driving waveform diagram of the electronic device having the force touch function according to the embodiment of FIGS. 2-4.

The host controller 510 is a micro controller unit (MCU). As shown in FIG. 5, the host controller 510 drives the display panel 110 by a display mode (DM), a first touch mode (TM1), and a second touch mode (TM2). The display mode (DM) may be set in a partial period every frame, the first touch mode (TM1) may be set in the remaining period of the (N)th frame (Fn), and the second touch mode (TM2) may be set in the remaining period of the (N+1)th frame (Fn+1).

For the display mode, the host controller 510 generates a mode signal (MS), a timing synchronized signal and digital video data, and provides the generated mode signal (MS), timing synchronized signal and digital video data to the driving integrated circuit 520.

For the first touch mode (TM1), the host controller 510 generates a mode signal (MS) and a touch report control signal, provides the generated mode signal (MS) and touch report signal to the driving integrated circuit 520, calculates a touch position based on touch raw data provided from the driving integrated circuit 520, and executes a first application corresponding to the calculated touch position. In this case, the first application corresponds to an application program based on the touch position, which is provided inside the electronic device. The first application may be an application program corresponding to a program icon marked at the touch position.

For the second touch mode (TM2), the host controller 510 generates a mode signal (MS) and a touch report control signal, provides the generated mode signal (MS) and touch report signal to the driving integrated circuit 520, calculates touch force and/or touch force position based on force raw data provided from the driving integrated circuit 520, and executes a second application corresponding to the calculated touch force and/or touch force position. In this case, the second application corresponds to an application program based on the touch force, which is provided inside the electronic device. The second application may be a security application program for a locking or unlocking function according to the touch force, but not limited to this type.

The driving integrated circuit 520 converts digital video data by each pixel into a data signal by each pixel (Vdata) on the basis of the timing synchronized signal and the digital video data supplied from the host controller 510 for the display mode (DM) in accordance with the mode signal (MS), supplies the data signal by each pixel (Vdata) to the corresponding data line (DL~DLn), generates a common voltage, supplies the generated common voltage to the touch electrode (TE), generates a gate signal (GS) which is synchronized with the common voltage, supplies the generated gate signal (GS) to the corresponding gate line (GL1~GLm), and drives liquid crystal by the use of electric field formed by the data signal and the common voltage, to thereby display an image on the display panel 110. If the gate driving circuit is prepared in the lower substrate 111 of the display panel 110, the driving integrated circuit 520 generates a gate control signal based on the timing synchronized signal, and provides the generated gate control signal to the gate driving circuit. Then, the gate driving circuit generates the gate signal (GS) in accordance with the gate control signal, and provides the generated gate signal (GS) to the gate line (GL1~GLm).

For the first touch mode (TM1) in accordance with the mode signal (MS), in response to the touch report control signal and touch synchronized signal supplied from the host controller 510, the driving integrated circuit 520 supplies a touch driving signal (TDS) to the touch electrode (TE) via a touch routing line, generates touch raw data by sensing the change of capacitance in the touch electrode (TE) in accordance with a user's touch through the touch routing line, and provides the touch raw data to the host controller 510 in response to the touch report control signal. In this case, the driving integrated circuit 520 sense the change of capacitance in the touch electrode (TE) through the sensing circuit of the self capacitive type, and generates the touch raw data based on the change of capacitance.

For the first touch mode (TM1), the touch driving signal (TDS) may include at least two driving pulses for improving the sensitivity.

For the second touch mode (TM2) in accordance with the mode signal (MS), in response to the touch report control signal and touch synchronized signal supplied from the host controller 510, the driving integrated circuit 520 generates force raw data by sensing the change of capacitance in the touch electrode (TE) in accordance with a user's force touch via a touch routing line, and provides the generated force raw data to the host controller 510 in response to the touch report control signal. In this case, the driving integrated circuit 520 may generate the force raw data by sensing the change of mutual capacitance (Cm) generated between the touch electrode (TE) and the housing plate 310 by the change of the distance (D) between the image display module 100 and the housing 300 in accordance with the bending of display panel 110 by a user's force touch. In this case, the driving integrated circuit 520 senses the change of mutual capacitance (Cm) through the sensing circuit of mutual capacitive type, and generates the force raw data based on the change of mutual capacitance (Cm).

For the second touch mode (TM2), the touch driving signal (TDS) may include an AC drive waveform, a DC drive voltage, or a ground voltage. The touch driving signal (TDS) may be any one selected among the AC drive waveform, the DC drive voltage, and the ground voltage in consideration of charging amount, circuit construction, and power consumption. In this case, the AC drive waveform may include a pulse wave, a sine wave, an attenuated sine wave, a square wave, a rectangle wave, a sawtooth wave, a triangle wave, or a step wave.

For the first touch mode (TM1) in accordance with the mode signal (MS), additionally, the driving circuit 500 may supply the touch driving signal (TDS) to the data line (DL~DLn) and the gate line (GL1~GLm) in synchronization with supply of the touch driving signal (TDS) to the touch electrode (TE). That is, the touch electrode (TE) is overlapped with the gate line and the data line, and a load of the touch electrode (TE) is increased due to a parasitic capacitance among the touch electrode, the gate line and the data line, to thereby lower the touch sensitivity for the touch sensing of the self capacitive type. In order to overcome this problem, the driving circuit 500 supplies the synchronized touch driving signals (TDS, TDS') to the touch electrodes (TE) and the gate lines (GL1~GLm) and the data lines (DL1~DLm) for the first touch mode (TM1), so that it is possible to reduce the load of the touch electrode (TE) caused by the parasitic capacitance among the touch electrode and the gate and data lines. In this case, the touch driving signal (TDS) applied to the touch electrodes (TE) and the touch driving signal (TDS) applied to the data lines (DL1~DLn) have the same phase and the same voltage level. Also, the touch driving signal (TDS') applied to the gate lines (GL1~GLm) and the touch driving signal (TDS) applied to the touch electrodes (TE) and the data lines (DL1~DLn) have the same phase and the same potential difference. That is, the touch driving signals (TDS, TDS') which are synchronized with the touch electrodes (TE) and the gate lines (GL1~GLm) and the data lines (DL1~DLn) have the same phase and the same potential difference, which enables to improve the sensitivity of the touch position and the force touch.

Figure 6:
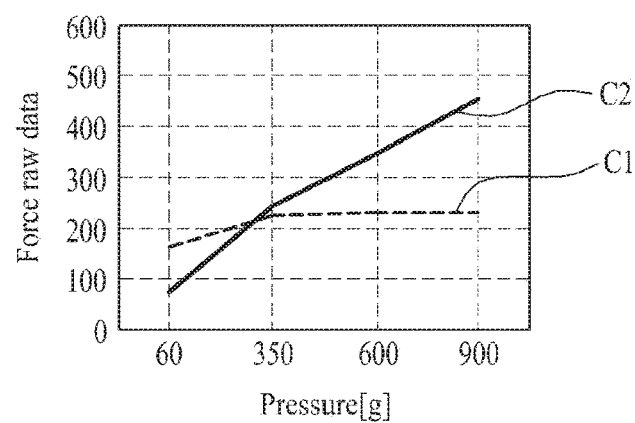
FIG. 6 illustrates an experimental example for explaining a change of force raw data according to a load in the electronic device shown in FIGS. 1-3

FIG. 6 illustrates an experimental example for explaining the change of force raw data according to the load in the electronic device shown in FIGS. 1-3.

In FIG. 6, a graph C1 shows the change of force raw data according to the load when the distance between the rear surface of the image display module and the housing plate is 90 um, and a graph C2 shows the change of force raw data according to the load when the distance between the rear surface of the image display module and the housing plate is 500 um.

As shown in the graph C1 of FIG. 6, the force raw data is changed by the touch pressure of 600 g or less, however, the force raw data is not changed by the touch pressure above 600 g.

As show in the graph C2 of FIG. 6, the force raw data is linearly increased in accordance with the increase of the touch pressure. As shown in FIG. 4, according as the distance (d') between the touch electrode (TE) and the housing plate 310 is decreased, the mutual capacitance (Cm) between the touch electrode (TE) and the housing plate 310 is largely changed. Thus, according as the distance between the rear surface of the image display module and the housing plate is increased, the change of the mutual capacitance becomes clear, thereby improving the sensitivity to the touch force. In this respect, it is preferable that the distance between the rear surface of the image display module and the housing plate be at least 500 um or more.

In the electronic device according to the this embodiment, the image display module 100 is attached to the cover window 200, the panel moving part 400 is prepared in the space between the image display module 100 and the housing plate 310, and a user's touch force is sensed by sensing the change of mutual capacitance between the housing plate 310 and the touch electrode (TE) of the image display module 100 provided at a predetermined interval from each other with the panel moving part 400 interposed in-between.

Eventually, in the electronic device according to the this embodiment, the touch electrode for sensing the touch position is used to sense the touch force of the mutual capacitive type, whereby it is possible to reduce data processing time without an additional electrode channel, and also to sense the touch force for the touch pressure above the predetermined threshold value.

Figure 7:
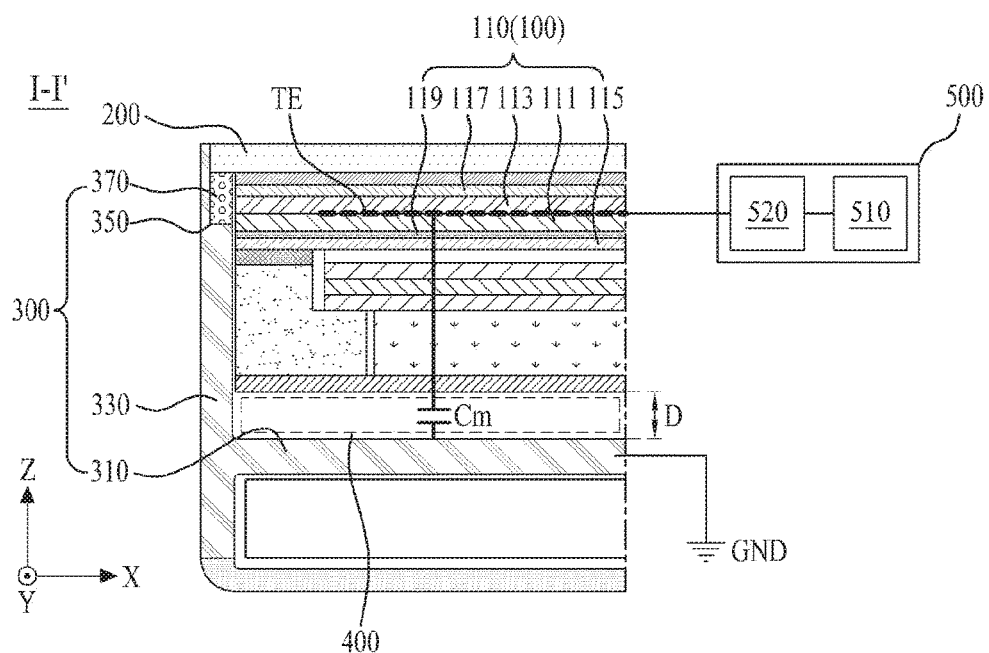
FIG. 7 illustrates an electronic device according to one embodiment.

FIG. 7 illustrates an electronic device according to one embodiment, which is obtained by additionally forming a transparent conductive layer in the display panel of the electronic device according to the embodiment shown in FIGS. 1-5. Thus, only the transparent conductive layer and structures related with the transparent conductive layer will be described as follows, and a detailed description for the same parts will be omitted.

Referring to FIG. 7, the transparent conductive layer 119 of the electronic device according to this embodiment is prepared between a lower polarizing member 115 and a lower substrate 111 of a display panel 110. That is, the transparent conductive layer 119 is prepared on an entire rear surface of the lower substrate 111 which faces toward a housing plate 310.

According as the transparent conductive layer 119 is electrically floating, the transparent conductive layer 119 offsets a fringing field formed around a touch electrode (TE) in accordance with a user's finger or a conductive touch so that it is possible to effectively sense a change of mutual capacitance between the touch electrode (TE) and the housing plate 310 in accordance with a touch force.

Also, the transparent conductive layer 119 functions as an anti-static layer which prevents static electricity occurring in a driving circuit 500 from being introduced to the inside of the display panel 100.

Figure 8:
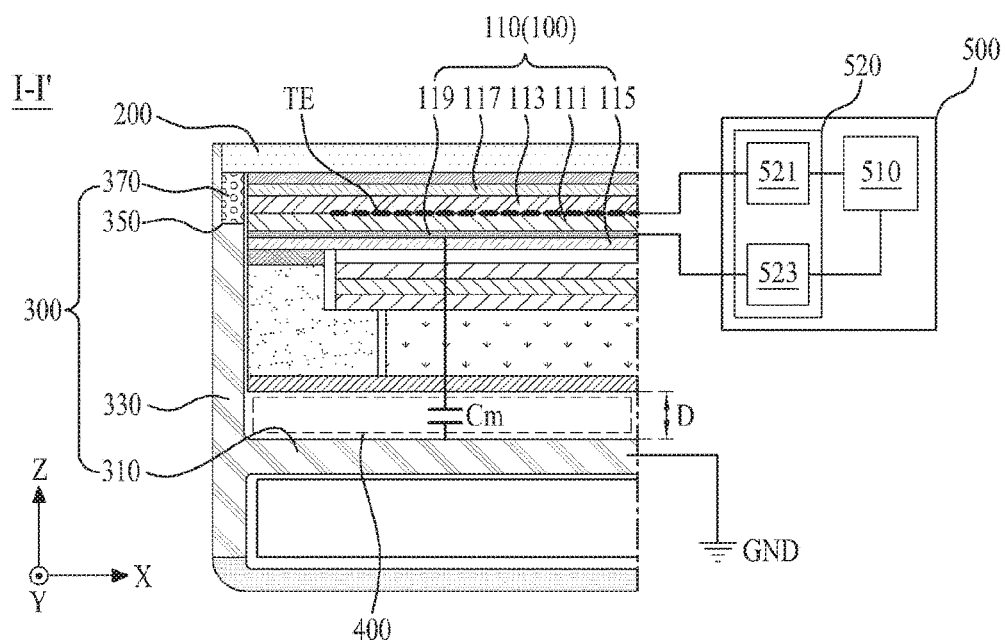
FIG. 8 illustrates an electronic device according to one embodiment, which is a cross sectional view along I-I' of FIG. 1.
Figure 9:
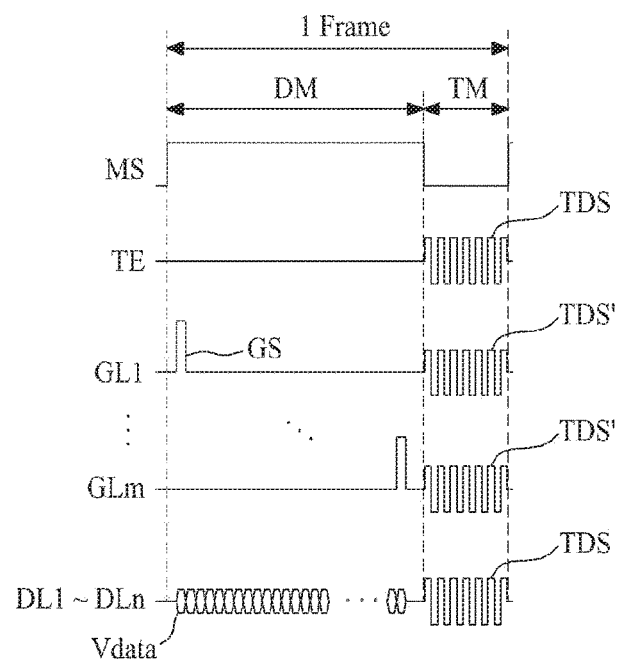
FIG. 9 is a driving waveform diagram of the electronic device according to the embodiment shown in FIGS. 7 and 8.

FIG. 8 illustrates an electronic device according to one embodiment, which is a cross sectional view along I-I' of FIG. 1. FIG. 9 is a driving waveform diagram of the electronic device according to the embodiment, which is obtained by changing a structure of a driving circuit in the electronic device according to the embodiment shown in FIGS. 7 and 8. Thus, only the driving circuit and structures related with the driving circuit will be described as follows, and a detailed description for the same parts will be omitted.

Referring to FIGS. 8 and 9, the driving circuit 500 of the electronic device according to this embodiment calculates a touch position by sensing a user's touch through the use of touch electrode (TE) prepared in a display panel 110, and calculates a touch position and/or touch force by sensing a user's force touch through a transparent conductive layer 119 prepared in the display panel 110. That is, in the electronic device according to the third embodiment, the touch electrode (TE) prepared in the display panel 110 is used as a sensing touch electrode for sensing a user's touch position, and the transparent conductive layer 119 is used as a driving touch electrode for sensing a user's force touch. To this end, the driving circuit 500 may include a host controller 510 and a driving integrated circuit 520.

The host controller 510 drives the display panel 110 by a display mode (DM) and a touch mode (TM). In this case, the display mode (DM) may be set in a partial period every frame, and the touch mode (TM) may be set in the remaining period every frame.

For the display mode (DM), the host controller 510 generates a mode signal (MS), a timing synchronized signal and digital video data, and provides the generated mode signal (MS), timing synchronized signal and digital video data to the driving integrated circuit 520.

For the touch mode (TM), the host controller 510 generates a mode signal (MS) and a touch report control signal, provides the generated mode signal (MS) and touch report control signal to the driving integrated circuit 520, calculates a touch position and/or touch force based on touch raw data and/or force raw data provided from the driving integrated circuit 520, and executes an application corresponding to the calculated touch position and/or touch force.

For the display mode (DM) in accordance with the mode signal (MS), the driving integrated circuit 520 displays an image on the display panel 110, which is the same as the display mode shown in FIG. 5, whereby a detailed description for the display mode will be omitted.

For the touch mode (TM) in accordance with the mode signal (MS), the driving integrated circuit 520 generates the touch raw data by sensing a user's touch through the touch electrode (TE) prepared in the display panel 110 in response to the touch synchronized signal and the touch report control signal supplied from the host controller 510, and provides the generated touch raw data to the host controller 510. At the same time, the driving integrated circuit 520 generates the force raw data by sensing a user's force touch through the transparent conductive layer 119 prepared in the display panel 110, and provides the generated force raw data to the host controller 510. To this end, the driving integrated circuit 520 according to an example may include a touch driver 521 and a force driver 523.

For the touch mode (TM) in accordance with the mode signal (MS), the touch driver 521 supplies a touch driving signal (TDS) to the touch electrode (TE) through a touch routing line in response to the touch report control signal and the touch synchronized signal supplied from the host controller 510, generates the touch raw data by sensing the change of capacitance in the touch electrode (TE) in accordance with a user's touch through the touch routing line, and provides the generated touch raw data to the host controller 510 in response to the touch report control signal. In this case, the touch driver 521 may generate the touch raw data by sensing the change of capacitance in the touch electrode (TE) through the sensing circuit of self capacitive type.

For the touch mode (TM) in accordance with the mode signal (MS), the force driver 523 generates the force raw data by sensing the change of mutual capacitance (Cm) occurring between the housing plate 310 and the transparent conductive layer 119 through the force routing line by the change of distance (D) between the housing 300 and the image display module 100 in accordance with a user's force touch in response to the touch report control signal and the touch synchronized signal supplied from the host controller 510, and provides the generated force raw data to the host controller 510 in response to the touch report control signal. In this case, the touch driver 521 may generate touch raw data by sensing the change of capacitance in the touch electrode (TE) through the sensing circuit of the self capacitive type. The fringing field, which is generated around the touch electrode (TE) by a user's touch force when sensing a user's force touch, becomes weaker according as the touch electrode (TE) becomes close to the housing plate 310 of the ground state, and the fringing field is offset by the transparent conductive layer 119, whereby there is no influence on the change of mutual capacitance (Cm).

In the electronic device according to this embodiment, a user's force touch is sensed by the change of mutual capacitance between the housing plate 310 and the transparent conductive layer 119 prepared on the rear surface of the display panel 110 instead of the touch electrode (TE) prepared inside the display panel 110, whereby the touch position sensing using the touch electrode (TE) and the force touch sensing using the transparent conductive layer 119 are independently carried out at the same time, thereby reducing a data processing time and also sensing a touch force for a touch pressure above a predetermined threshold value.

Figure 10:
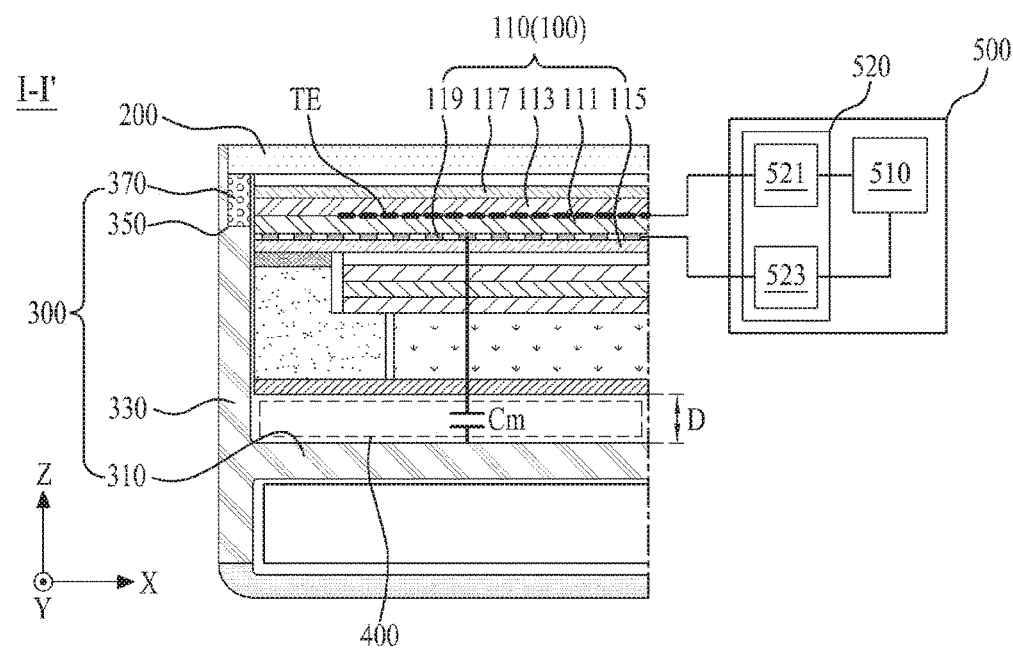
FIG. 10 illustrates an electronic device according to one embodiment, which is a cross sectional view along I-I' of FIG. 1.

FIG. 10 illustrates an electronic device according to one embodiment, which is a cross sectional view along I-I' of FIG. 1. This is obtained by changing a structure of a transparent conductive layer in the electronic device according to the embodiment shown in FIGS. 7 and 8. Thus, only the transparent conductive layer and structures related with the transparent conductive layer will be described as follows, and a detailed description for the same parts will be omitted.

Referring to FIG. 10, the electronic device according to this embodiment is provided with the transparent conductive layer 119 including a plurality of conductive patterns 119a.

Figure 11A:
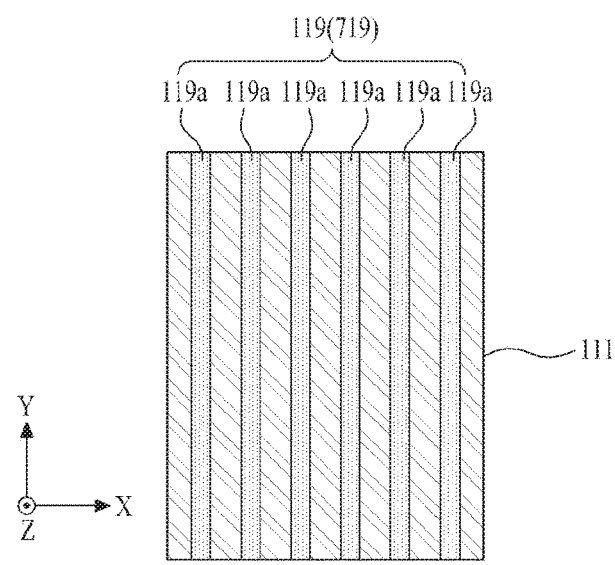
FIG. 11A illustrates a plurality of conductive patterns according to an example of FIG. 10.

The plurality of conductive patterns 119a are prepared in a display panel 110, and more particularly, a rear surface of a lower substrate 111, wherein each conductive pattern 119a has a length parallel to a first direction (Y), and the plurality of conductive patterns 119a are provided at fixed intervals along a second direction (X) which is perpendicular to the first direction (Y). The plurality of conductive patterns 119a are respectively connected with a force driver 523 of a driving circuit 500 through a plurality of force routing lines. As shown in FIG. 11A, each conductive pattern 119a according to an example may be formed in a bar or line shape.

Figure 11B:
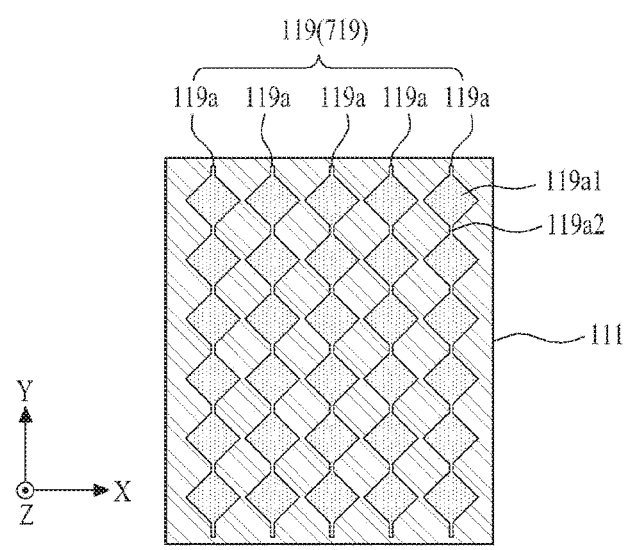
FIG. 11B illustrates a plurality of conductive patterns according to another example of FIG. 10.

As shown in FIG. 11B, each of the plurality of conductive patterns 119a may include a plurality of pattern electrodes 119a1 formed in a polygonal shape with a predetermined size and provided at fixed intervals along the first direction (Y), and bridge electrodes 1192a2 provided between each of the plurality of pattern electrodes 119a1 for connection of the neighboring pattern electrodes 119a1.

For the touch mode (TM) in accordance with the mode signal (MS) shown in FIG. 9, the force driver 523 generates plural force raw data by individually sensing the change of mutual capacitance (Cm) occurring between each of the conductive patterns 119a and a housing plate 310 in accordance with a user's force touch through each of a plurality of force routing lines in response to a touch report control signal and a touch synchronized signal supplied from a host controller 510, and provides the plural force raw data to the host controller 510 in response to the touch report control signal.

In the electronic device according to this embodiment, a multi-force touch is sensed by individually sensing the change of mutual capacitance (Cm) between the housing plate 310 and each of the plurality of conductive patterns 119a through the plurality of conductive patterns 119a, whereby it is possible to calculate a position of force touch and a touch force by each position, and also to execute various corresponding applications.

Figure 12:
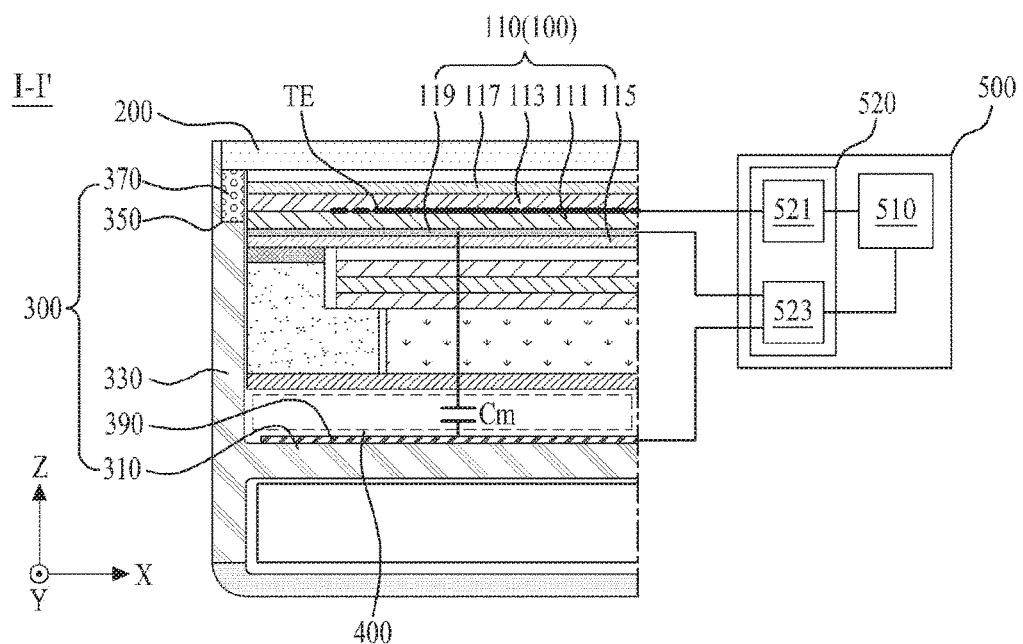
FIG. 12 illustrates an electronic device according to one embodiment.
Figure 13:
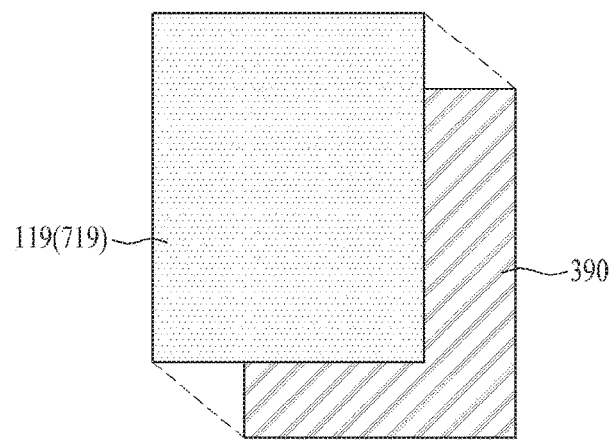
FIG. 13 illustrates a force electrode member and a transparent conductive layer according to an example of FIG. 12.

FIG. 12 illustrates an electronic device according to one embodiment. FIG. 13 illustrates a transparent conductive layer and a force electrode member according to an example of FIG. 12, which is obtained by changing a structure of a housing in the electronic device according to the embodiment shown in FIG. 8. Thus, only the housing, transparent conductive layer and force driver will be described as follows, and a detailed description for the same parts will be omitted.

Referring to FIGS. 12 and 13, the housing 300 of the electronic device according to this embodiment may include a housing plate 310, a housing sidewall 320, and a force electrode member 390.

The housing 300 according to an example has a space defined by the housing plate 310 and the housing sidewall 320. The housing 300 may be formed in a case shape whose upper surface is opened. The housing 300 may include a conductive material or a plastic material. For example, the housing 300 may include an aluminum (Al) material, an invar material, or a magnesium (Mg) material.

The housing plate 310 corresponds to a bottom surface of the space, that is, the housing plate 310 covers a rear surface of a backlight unit 130. This is the same as the aforementioned embodiment, whereby a detailed description for the housing plate 310 will be omitted.

The housing sidewall 330 is perpendicular to each lateral surface of the housing plate 310. The housing sidewall 330 supports a cover window 200, whereby each lateral surface of an image display module 100 attached to the cover window 200 is covered by the housing sidewall 330. In this case, an upper side of the housing sidewall 330 covers each lateral surface of the cover window 200.

The force electrode member 390 is prepared in an upper surface of the housing plate 310 while being overlapped with a transparent conductive layer 119 prepared in a display panel 110, wherein a shape of the force electrode member 390 may be the same as a shape of the transparent conductive layer 119. That is, the force electrode member 390 may be formed as a single body.

The force electrode member 390 may include an opaque metal material or a transparent conductive material. For example, the force electrode member 390 may include a graphite material or a transparent conductive material including Zn, In or Sn based oxide.

If the housing 300 includes a conductive material, an insulating member may be prepared between the force electrode member 390 and the housing plate 310. If the housing 300 is formed of a plastic material or a nonconductive material, it is possible to omit the insulating member. For improvement of adhesion between the housing plate 300 and the force electrode member 390, it is preferable that the insulating member be prepared between the force electrode member 390 and the housing plate 310.

For sensing a touch force, the force electrode member 390 according to an example is used as a sensing touch electrode (or second touch electrode), which is connected with a force driver 520 via a force sensing routing line. In this case, the transparent conductive layer 119 prepared in the display panel 110 is used as a driving touch electrode (or first touch electrode), and is connected with the force driver 520 via a force driving routing line.

The force electrode member 390 according to another example is used as a driving touch electrode for sensing a touch force, which is connected with the force driver 520 via a force driving routing line. In this case, the transparent conductive layer 119 prepared in the display panel 110 is used as a sensing touch electrode for sensing a touch force, and is connected with the force driver 520 via a force sensing routing line.

For the touch mode (TM) in accordance with the mode signal (MS) shown in FIG. 9, the force driver 523 according to an example supplies the aforementioned touch driving signal (TDS) to the transparent conductive layer 119 via the force driving routing line in response to the touch synchronized signal and the touch report control signal supplied from the host controller 510, generates force raw data by sensing the change of mutual capacitance (Cm) occurring between the transparent conductive layer 119 and the force electrode member 390 via the force sensing routing line connected with the force electrode member 390 in accordance with a user's force touch, and provides the generated force raw data to the host controller 510 in response to the touch report control signal.

For the touch mode (TM) in accordance with the mode signal (MS), the force driver 523 according to another example supplies the aforementioned touch driving signal (TDS) to the force electrode member 390 via the force driving routing line in response to the touch synchronized signal and the touch report control signal supplied from the host controller 510, generates force raw data by sensing the change of mutual capacitance (Cm) occurring between the force electrode member 390 and the transparent conductive layer 119 via the force sensing routing line connected with the transparent conductive layer 119 in accordance with a user's force touch, and provides the generated force raw data to the host controller 510 in response to the touch report control signal.

In the electronic device according to this embodiment, the change of mutual capacitance (Cm) between the transparent conductive layer 119 prepared in the display panel 110 and the force electrode member 390 additionally provided in the housing 300 is sensed so that the touch position sensing using the touch electrode (TE) and the force touch sensing using the transparent conductive layer 119 and the force electrode member 390 are independently carried out at the same time, thereby reducing a data processing time and also sensing a touch force for a touch pressure above a predetermined threshold value.

Figure 14:
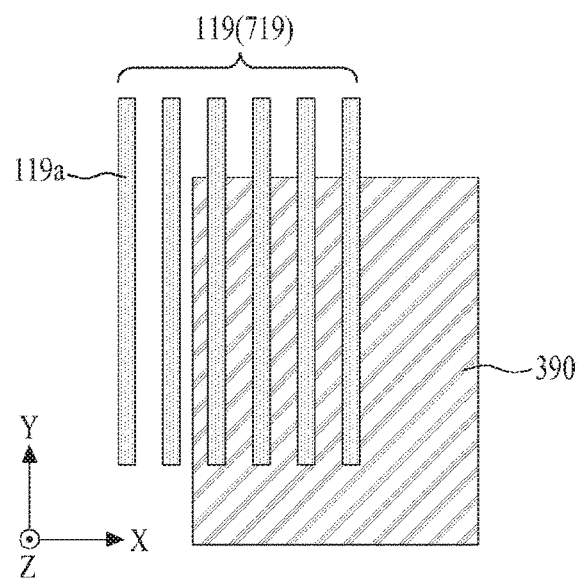
FIG. 14 illustrates only transparent conductive layer and force electrode member according to another example of FIG. 12.

FIG. 14 illustrates only transparent conductive layer and force electrode member of an electronic device according to another example of FIG. 12, which is obtained by changing a structure of the transparent conductive layer in the electronic device according to the embodiment shown in FIG. 13. Thus, only the transparent conductive layer will be described in detail as follows.

Referring to FIG. 14, in the electronic device according to this embodiment, the transparent conductive layer 119 prepared in a display panel 110 may include a plurality of conductive patterns 119a.

Each conductive pattern 119a according to an example may be formed in a bar or line shape, as shown in FIG. 11A, or each conductive pattern 119a may include a plurality of pattern electrodes 119a1 and bridge electrodes 119a2, as shown in FIG. 11B.

Each of the plurality of conductive patterns 119a may be used as a driving touch electrode or a sensing touch electrode for sensing a touch force. Preferably, the conductive pattern 119a is used as the sensing touch electrode enabling a multi-touch sensing.

For the touch mode (TM) in accordance with the mode signal (MS) shown in FIG. 9, a force driver 523 supplies the aforementioned touch driving signal (TDS) to a force electrode member 390 via a force driving routing line in response to a touch synchronized signal and a touch report control signal supplied from a host controller 510, generates force raw data by sensing the change of mutual capacitance (Cm) occurring between each of the plurality of conductive patterns 119a and the force electrode member 390 via a plurality of force sensing routing line respectively connected with the plurality of conductive patterns 119a in accordance with a user's touch force, and provides the generated force raw data to the host controller 510 in response to the touch report control signal.

In the electronic device according to this embodiment, the change of mutual capacitance (Cm) between each of the plurality of conductive patterns 119a and the force electrode member 390 is individually sensed by the plurality of conductive patterns 119a so that it is possible to sense the multi-force touch, calculate a position of force touch and a touch force by each position, and also execute various corresponding applications.

Figure 15:
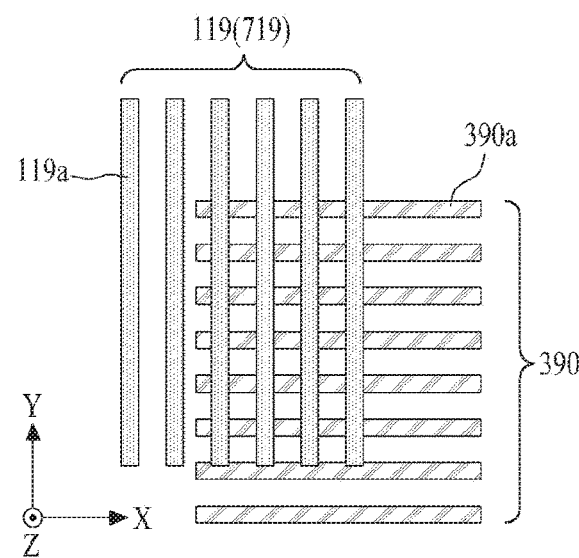
FIG. 15 illustrates only transparent conductive layer and force electrode member according to another example of FIG. 12.

FIG. 15 illustrates only transparent conductive layer and force electrode member of an electronic device according to according to another example of FIG. 12, which is obtained by changing a structure of the force electrode member in the electronic device according to the embodiment shown in FIG. 14. Thus, only the force electrode member will be described in detail as follows.

Referring to FIG. 15, in the electronic device according to this embodiment, the force electrode member 390 may include a plurality of force electrode patterns 390a. The plurality of force electrode patterns 390a may be separated by patterns of non-conductive electrodes.

Each force electrode pattern 390a has a length parallel to a second direction (X), and the plurality of force electrode patterns 390a are disposed in a housing 300, and more particularly, an upper surface of a housing plate 310 and provided at fixed intervals along a first direction (Y).

The plurality of force electrode patterns 390a according to an example are used as a sensing touch electrode for sensing a touch force, and are connected with a force driver 520 via a force sensing routing line. In this case, the plurality of conductive patterns 119a prepared in a display panel 110 are used as a driving touch electrode for sensing a touch force, and are connected with the force driver 520 via a force driving routing line.

The plurality of force electrode patterns 390*a* according to another example are used as a driving touch electrode for sensing a touch force, and are connected with the force driver 520 via a force driving routing line. In this case, the plurality of conductive patterns 119*a* prepared in the display panel 110 are used as a sensing touch electrode for sensing a touch force, and are connected with the force driver 520 via a force sensing routing line.

Each of the plurality of force electrode patterns 390*a* according to an example may be formed in a bar or line shape. In this case, each of the plurality of force electrode patterns 390*a* is perpendicular to each of the plurality of conductive patterns 119*a* prepared in the display panel 110. Accordingly, a mutual capacitance for sensing a touch force is formed at an intersection between the force electrode pattern 390*a* and the conductive pattern 119*a*.

Each of the plurality of force electrode patterns 390*a* according to another example is overlapped with each of the plurality of conductive patterns 119*a*, as shown in FIG. 11B. That is, on assumption that each of the plurality of conductive patterns 119*a* is an upper force electrode pattern, and each of the plurality of force electrode patterns 390*a* is a lower force electrode pattern, the upper force electrode pattern 119*a* includes a plurality of upper pattern electrodes 119*a*1 having a polygonal shape, and an upper bridge pattern for connecting the neighboring upper pattern electrodes 119*a*1 with each other. Although not shown, the lower force electrode pattern 390*a* includes lower pattern electrodes overlapped with the upper pattern electrodes 119*a*1, and a lower bridge pattern for connecting the neighboring lower pattern electrodes with each other.

For the touch mode (TM) in accordance with the mode signal (MS) shown in FIG. 9, a force driver 523 according to an example individually supplies the aforementioned touch driving signal (TDS) to the plurality of conductive patterns 119*a* via a force driving routing line in response to a touch synchronized signal and a touch report control signal supplied from a host controller 510, generates force raw data by individually sensing the change of mutual capacitance occurring between the plurality of conductive patterns 119*a* and the plurality of force electrode patterns 390*a* via a plurality of force sensing routing lines respectively connected with the plurality of force electrode patterns 390*a* in accordance with a user's force touch, and provides the generated force raw data to the host controller 510 in response to the touch report control signal.

For the touch mode (TM) in accordance with the mode signal (MS) shown in FIG. 9, a force driver 523 according to another example individually supplies the aforementioned touch driving signal (TDS) to the plurality of force electrode patterns 390*a* via a force driving routing line in response to a touch synchronized signal and a touch report control signal supplied from a host controller 510, generates force raw data by individually sensing the change of mutual capacitance occurring between the plurality of conductive patterns 119*a* and the plurality of force electrode patterns 390*a* via a plurality of force sensing routing lines respectively connected with the plurality of conductive patterns 119*a* in accordance with a user's force touch, and provides the generated force raw data to the host controller 510 in response to the touch report control signal.

In the electronic device according to this embodiment, the change of mutual capacitance (Cm) between each of the plurality of conductive patterns 119*a* and each of the plurality of force electrode patterns 390*a* is individually sensed by the plurality of conductive patterns 119*a* or the plurality of force electrode patterns 390*a* so that it is possible to precisely sense the multi-force touch, calculate a position of force touch and a touch force by each position, and also execute various corresponding applications.

In the electronic devices according to the embodiments shown in FIGS. 1 to 15, the image display module 100 includes the display panel 110 with a liquid crystal layer, but not limited to this structure. The aforementioned backlight unit 130 and guide frame 150 may be removed from the image display module 100, and the display panel 110 having the liquid crystal layer may be substituted by a display panel having an organic light emitting device and a touch electrode. Even in this case, it is possible to sense a user's force touch.

Figure 16:
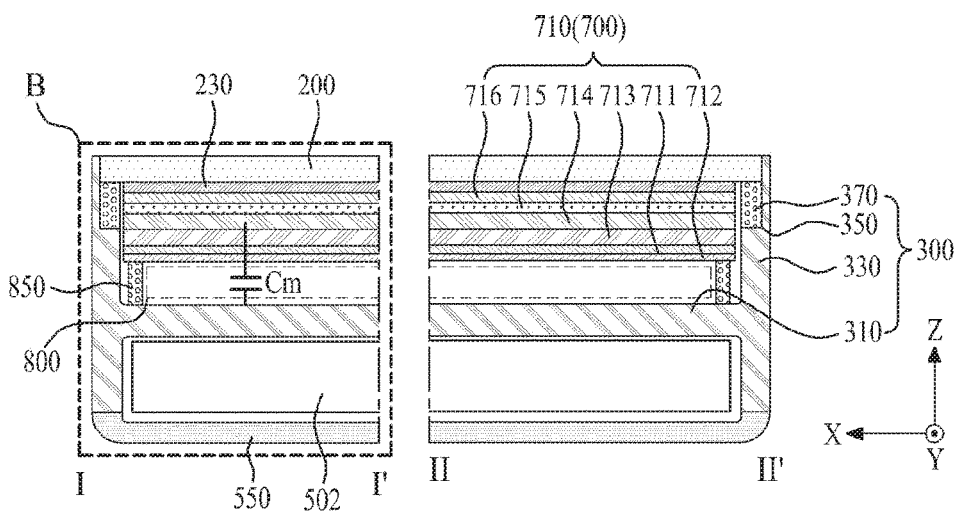
FIG. 16 illustrates the electronic device according to one embodiment, which is a cross sectional view along I-I' and II-II' of FIG. 1.
Figure 17:
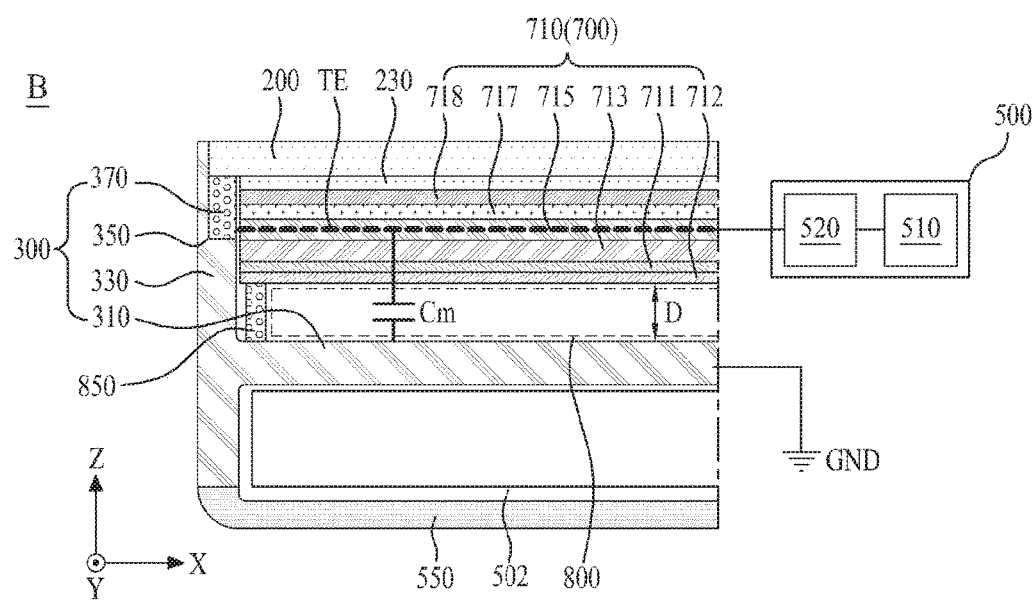
FIG. 17 is a partial expanded view of 'B' portion of FIG. 16.

FIG. 16 illustrates an electronic device according to one embodiment, which is cross sectional view along I-I' and of FIG. 1. FIG. 17 is a partial expanded view showing 'B' of FIG. 16, which is obtained by changing a structure of the image display module in the electronic device according to the embodiment shown in FIGS. 1 to 5. Thus, a detailed description for the same parts as those of the one of embodiment will be omitted, or only brief description for the same parts as those of the one of embodiment will be given.

Referring to FIGS. 16 and 17, the electronic device according to this embodiment may include an image display module 700, a cover window 200, a housing 300, a panel moving part 800, and a driving circuit 500.

The image display module 700 displays an image corresponding to a video signal supplied from the driving circuit 500, or senses a touch position for a user's touch. For a display mode, the image display module 700 displays an image corresponding to a video signal supplied form the driving circuit 500. For a touch sensing mode, the image display module 700 is driven in a touch mode of sensing a touch position for a user's touch by a driving circuit.

The image display module 700 according to an example may include a display panel 710.

The display panel 710 corresponds to an organic light emitting display panel for displaying an image by the use of light emission of an organic light emitting layer. The display panel 710 may include a base substrate 711, a back plate 712, a pixel array 713, an encapsulation layer 714, a touch panel 715, and a polarizing film 716.

The base substrate 711 may be formed of a flexible material. For example, the base substrate 711 may be a polyimide (PI) film, but not limited to this type.

The back plate 712 is provided to maintain a plane state of the base substrate 711. The back plate 712 according to an example may be formed of a transparent plastic, for example, any one among PET (polyethyleneterephthalate), PC (polycarbonate), PES (polyethersulfone), PEN (polyethylenapthanate), PU (polyurethanes) and PNB (polynorborneen). The back plate 712 is attached to a rear surface of the base substrate 711 by the use of optical adhesive (not shown), to thereby maintain the plane state of the flexible base substrate 711.

The pixel array 713 is prepared on the base substrate 711. Although not shown, the pixel array 713 may include a plurality of pixels prepared every pixel region defined by crossing a plurality of gate lines and a plurality of data lines. Each pixel may include a switching transistor connected with the gate and data lines, a driving transistor supplied with a data signal from the switching transistor, and an organic light emitting device which emits light by a data current supplied from the driving transistor. The organic light emitting device may include an anode electrode connected with the driving transistor, an organic light emitting layer prepared on the anode electrode, and a cathode electrode prepared on the organic light emitting layer. Each pixel is defined by a bank pattern.

At one side of the base substrate 711, there is a pad (not shown) which is connected with each signal line prepared in the pixel array 713. The pad is connected with the driving circuit 500.

The encapsulation layer 714 is prepared on an entire upper surface of the base film 711, to thereby cover the pixel array 713. The encapsulation layer 714 protects the organic light emitting device from external oxygen or moisture.

The touch panel 715, which is disposed on the encapsulation layer 714, senses a user's touch position. The touch panel 715 has an electrode structure of mutual capacitance method, in which a mutual capacitance is changed in accordance with a user's touch. The touch panel 715 according to an example may include a first touch substrate attached to an upper surface of the encapsulation layer 714 and provided with a plurality of first touch electrodes (TE), and a plurality of second touch electrodes which are attached to the first touch substrate and are perpendicular to the plurality of first touch electrodes (not shown). In this case, each of the plurality of first touch electrodes (TE) may be used as a sensing touch electrode for sensing a touch position, and each of the plurality of second touch electrodes may be used as a driving touch electrode for sensing a touch position. The plurality of first touch electrodes (TE) may be used as a sensing touch electrode for sensing a user's touch force.

The polarizing film 716, which is attached to an entire upper surface of the touch panel 715, prevents a reflection by an external light, thereby improving visibility of the display panel 710.

The cover window 200, which is attached to an entire front surface of the display panel 710, is supported by the housing 300, thereby supporting the image display module 700. In this case, the cover window 200 is movably supported by the housing 300. The cover window 200 is attached to the entire front surface of the display panel 710, and more particularly, to an entire front surface of the polarizing film 716 by the use of transparent adhesive member 230, thereby supporting the display panel 710 and protecting the display panel 710 from an external impact. In this case, the transparent adhesive member 230 may include OCA (Optical Clear Adhesive) or OCR (Optical Clear Resin).

The cover window 200 according to an example may include a tempered glass, a transparent plastic, or a transparent film.

The housing 300 receives the image display module 700 therein, and also supports the cover window 200. That is, the housing 300 covers each lateral surface and the rear surface of the image display module 700 attached to the cover window 200. The housing 300 is identical in structure to the housing of the electronic device according to the first embodiment, whereby a detailed description for the housing 300 will be omitted. Hereinafter, the housing 300 will be described in brief.

The housing 300 according to an example has a space defined by a housing plate 310 and a housing sidewall 320. The housing 300 may be formed in a case shape whose upper surface is opened. The housing 300 may include a conductive material. The housing 300 is electrically grounded (GND).

The housing plate 310 corresponds to a bottom surface of the space, that is, the housing plate 310 covers a rear surface of the display panel 710.

The housing sidewall 330 is perpendicular to each lateral surface of the housing plate 310. The housing sidewall 330 supports the cover window 200, to thereby cover each lateral surface of the display panel 710 attached to the cover window 200 and each lateral surface of the cover window 200. A height of the housing sidewall 330 is larger than an entire height (or thickness) of the image display module 700, whereby the image display module 700 attached to the cover window 200 is provided at a predetermined interval from the housing plate 310.

The panel moving part 800 is prepared between the housing 300 and the rear surface of the image display module 700, which provides a space for the image display module 700 to be moved in an up-and-down direction (Z) by a user's touch pressure. That is, the panel moving part 800 may be defined by the space between the housing plate 310 and the rear surface of the image display module 700 provided at the predetermined interval from the housing plate 310 by the height of the housing sidewall 330.

As shown in FIG. 4, in circuit, the panel moving part 800 corresponds to a mutual capacitance (Cm) formed between the housing plate 310 and the touch electrode (TE) prepared in the display panel 110. The mutual capacitance (Cm) is increased according as a distance (d) between the touch electrode (TE) and the housing plate 310 is decreased by a user's touch pressure (TP).

Additionally, the electronic device according to the one of embodiment may further include a module supporter 850.

The module supporter 850 is disposed in the edge of the rear surface of the image display module 700, and more particularly, between the edge of a rear surface of the back plate 712 and the housing plate 310, to thereby support the edge of the rear surface of the back plate 712. That is, the module supporter 850 supports the edge of the rear surface of the image display module 700 without interrupting the image display module 700 bent by a user's touch force, to thereby prevent the image display module 700 from being separated from the cover window 200.

The module supporter 850 according to an example may include an impact-absorbing pad or a double-sided adhesive foam pad. In this case, the module supporter 850 may include a hollow (or disconnecting portion), wherein the hollow enables a communication between the inside and outside of the module moving part 800 surrounded by the module supporter 850 so that the image display module 700 is capable of being bent by a user's touch force.

The driving circuit 500 is provided in the pad prepared in the base substrate 711, wherein the driving circuit 500 time-divides the display panel 710 by a display mode and a touch mode. For the display mode, the driving circuit 500 displays an image on the display panel 710. For the touch mode, the driving circuit 500 senses a user's touch and/or force touch through the use of touch electrode (TE), calculates a touch position and/or touch force, and executes an application corresponding to the calculated touch position and/or touch force. The driving circuit 500 is identical in structure to the driving circuit of the electronic device according to the first embodiment, whereby a detailed description for the driving circuit 500 will be omitted.

In the electronic device according to the eighth embodiment, the image display module 700 is attached to the cover window 200, the panel moving part 800 is prepared in the space between the housing plate 310 and the image display module 700, and a user's touch force is sensed by sensing the change of mutual capacitance formed between the housing plate 310 and the first touch electrode (TE) of the image display module 700 which are spaced from each other by the panel moving part 800 interposed in-between.

Figure 18:
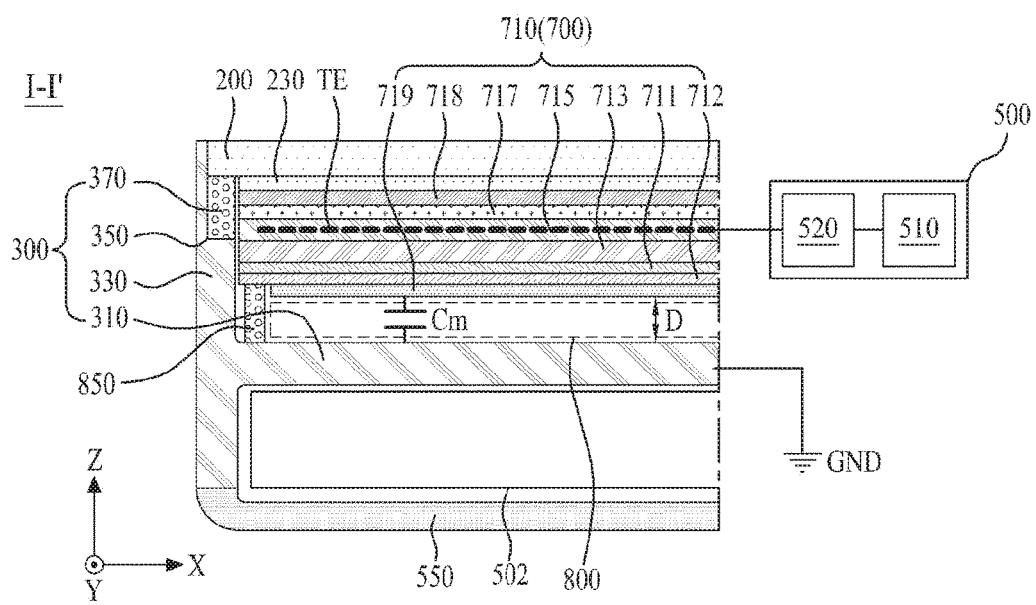
FIG. 18 illustrates an electronic device according to one embodiment.

FIG. 18 illustrates an electronic device according to the one embodiment, which is obtained by additionally forming a transparent conductive layer in the display panel of the electronic device according to the embodiment shown in FIGS. 16 and 17. Thus, only the transparent conductive layer and structures related with the transparent conductive layer will be described as follows, and a detailed description for the same parts will be omitted.

Referring to FIG. 18, the transparent conductive layer 719 of the electronic device according to this embodiment is prepared in a rear surface of a display panel 710, that is, a rear surface of a backlight plate 712. According as the transparent conductive layer 719 is electrically floating, the transparent conductive layer 719 offsets a fringing field formed around a touch electrode in accordance with a user's finger or a conductive touch so that it functions as an anti-static layer. This is the same as the transparent conductive layer 119 of the electronic device according to the embodiment shown in FIG. 7, whereby a detailed description for the same parts will be omitted.

Figure 19:
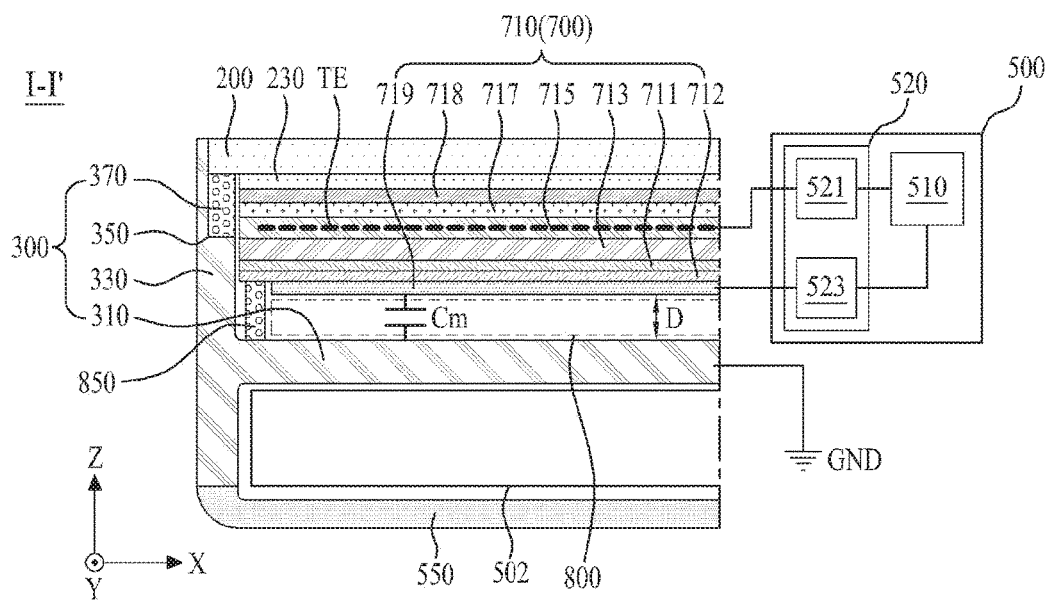
FIG. 19 illustrates an electronic device according to one embodiment, which is a cross sectional view along I-I' of FIG. 1.

FIG. 19 illustrates an electronic device according to one embodiment, which is a cross sectional view along I-I' of FIG. 1. This is obtained by changing a structure of a driving circuit in the electronic device according to the embodiment shown in FIG. 18. Thus, only the driving circuit and structures related with the driving circuit will be described as follows, and a detailed description for the same parts will be omitted.

Referring to FIG. 19, the driving circuit 500 of the electronic device according to this embodiment calculates a touch position by sensing a user's touch through the use of touch electrode (TE) prepared in a display panel 710, and calculates a touch position and/or touch force by sensing a user's force touch through a conductive layer 719 prepared in the display panel 710. That is, in the electronic device according to this embodiment, the conductive layer 719 is used as a sensing touch electrode for sensing a user's force touch. To this end, the driving circuit 500 may include a host controller 510 and a driving integrated circuit 520. Except that each of the host controller 510 and the driving integrated circuit 520 senses a force touch for the conductive layer 719, the driving circuit 500 of the electronic device according to this embodiment shown in FIG. 18 is the same as that of the electronic device according to the embodiment, whereby a detailed description for the same parts will be omitted.

In the electronic device according to this embodiment, the touch position sensing using the touch electrode (TE) and the force touch sensing using the conductive layer 719 are independently carried out at the same time, thereby reducing a data processing time and also sensing a touch force for a touch pressure above a predetermined threshold value.

Figure 20:
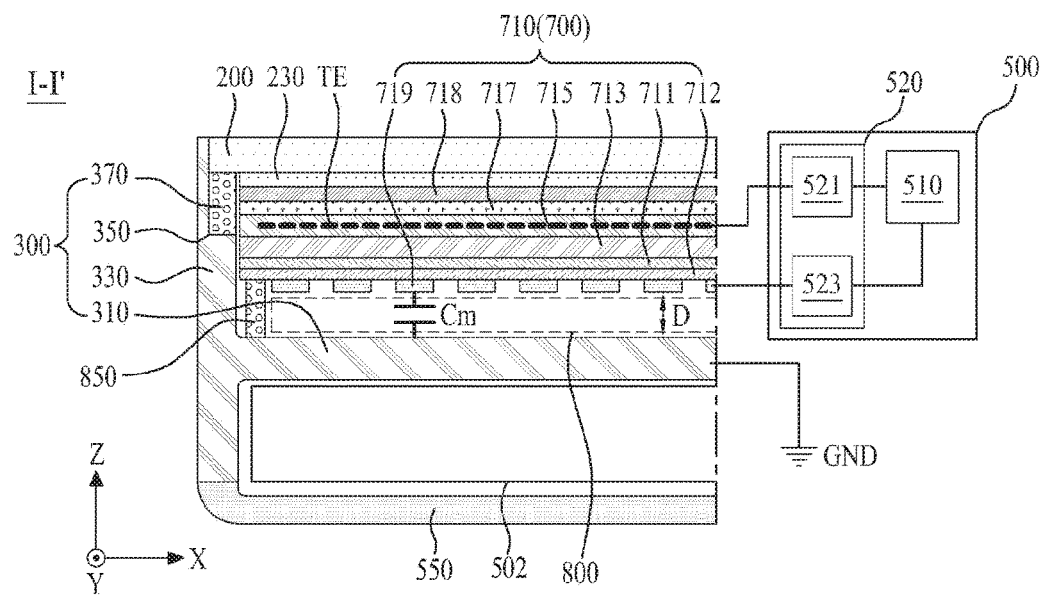
FIG. 20 illustrates an electronic device according to one embodiment, which is a cross sectional view along I-I' of FIG. 1.

FIG. 20 illustrates an electronic device according to one embodiment, which is a cross sectional view along I-I' of FIG. 1. This is obtained by changing a structure of a conductive layer in the electronic device according to the embodiment shown in FIG. 19. Thus, only the conductive layer and structures related with the conductive layer will be described as follows, and a detailed description for the same parts will be omitted.

Referring to FIG. 20, the electronic device according to this embodiment is provided with the conductive layer 719 including a plurality of conductive patterns 119a.

The plurality of conductive patterns 119a are prepared in a display panel 110, and more particularly, a rear surface of a lower substrate 111, wherein each conductive pattern 119a has a length parallel to a first direction (Y), and the plurality of conductive patterns 119a are provided at fixed intervals along a second direction (X) which is perpendicular to the first direction (Y). The plurality of conductive patterns 119a are respectively connected with a force driver 523 of a driving circuit 500 through a plurality of force routing lines. Each conductive pattern 119a according to an example may be formed in a bar or line shape, as shown in FIG. 11A, or each of the plurality of conductive patterns 119a may include a plurality of pattern electrodes 119a1, and bridge electrodes 119a2 provided between each of the plurality of pattern electrodes 119a1 for connection of the neighboring pattern electrodes 119a1, as shown in FIG. 11B.

For the touch mode (TM) in accordance with the mode signal (MS) shown in FIG. 9, the force driver 523 generates plural force raw data by individually sensing the change of mutual capacitance (Cm) occurring between each of the conductive patterns 119a and a housing plate 310 in accordance with a user's force touch through each of a plurality of force routing lines in response to a touch report control signal and a touch synchronized signal supplied from a host controller 510, and provides the plural force raw data to the host controller 510 in response to the touch report control signal.

In the electronic device according to this embodiment, a multi-force touch is sensed by individually sensing the change of mutual capacitance (Cm) between the housing plate 310 and each of the plurality of conductive patterns 119a through the plurality of conductive patterns 119a, whereby it is possible to calculate a position of force touch and a touch force by each position, and also to execute various corresponding applications.

Figure 21:
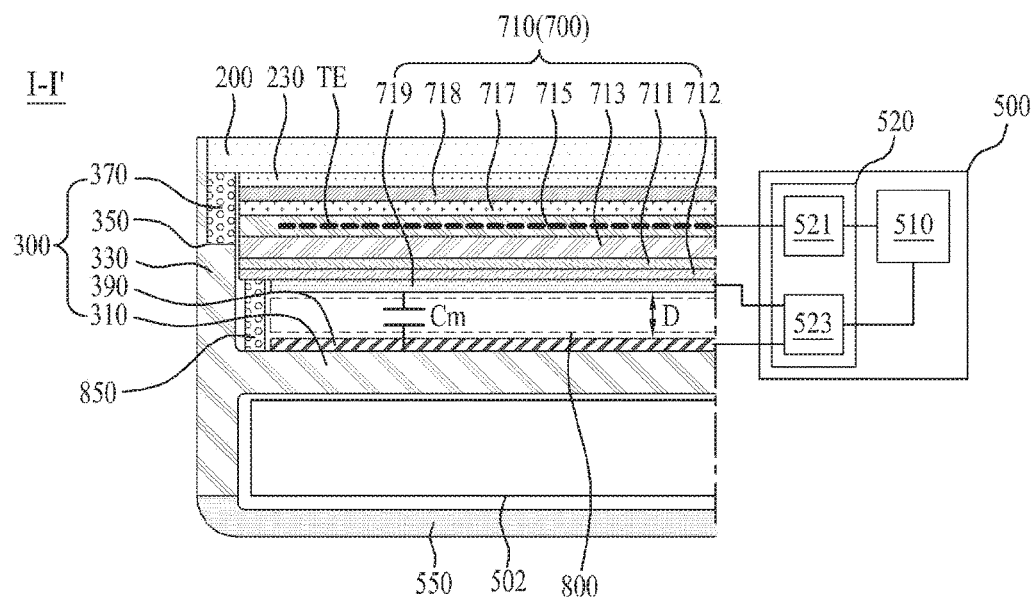
FIG. 21 illustrates an electronic device according to one embodiment, which is a cross sectional view along I-I' of FIG. 1.

FIG. 21 illustrates an electronic device according to one embodiment, which is a cross sectional view along I-I' of FIG. 1. This is obtained by changing a structure of a housing in the electronic device according to the embodiment shown in FIG. 19. Thus, only the housing, transparent conductive layer and force driver will be described as follows, and a detailed description for the same parts will be omitted.

Referring to FIG. 21, the housing 300 of the electronic device according to this embodiment may include a housing plate 310, a housing sidewall 320, and a force electrode member 390. The electronic device having this structure is the same as the electronic device according to the embodiment shown in FIGS. 12 and 13. In the electronic device according to this embodiment, the conductive force electrode member 390 is prepared in the housing plate 310, to thereby sense the change of mutual capacitance between the force electrode member 390 and a conductive layer 719 through a force driver 523 of a driving circuit 500. Thus, a detailed description for the same parts will be omitted.

In the electronic device according to this embodiment, the change of mutual capacitance between the conductive layer 719 prepared in a display panel 710 and the force electrode member 390 additionally prepared in the housing 300 is sensed so that the touch position sensing using the touch electrode (TE) and the force touch sensing using the conductive layer 719 and the force electrode member 390 are independently carried out at the same time, thereby reducing a data processing time and also sensing a touch force for a touch pressure above a predetermined threshold value.

Meanwhile, as shown in FIG. 14, in the electronic device according to this embodiment, the conductive layer 719 may include a plurality of conductive patterns 119a, and the force electrode member 390 may be formed as a single body overlapped with the plurality of conductive patterns 119a. Furthermore, the conductive layer 719 may be formed as a single body, and the force electrode member 390 may be provided with a plurality of force electrode patterns 390a overlapped with the conductive layer 719. In this case, as mentioned above, it is possible to precisely sense a multi-force touch, calculate a position of force touch and a touch force by each position, and also execute various corresponding applications.

Meanwhile, as shown in FIG. 15, in the electronic device according to this embodiment, the conductive layer 719 may include a plurality of conductive patterns 119a, and the force electrode member 390 may include a plurality of force electrode patterns 390a which are perpendicular to the plurality of conductive patterns 119a. In this case, as mentioned above, it is possible to precisely sense a multi-force touch, calculate a position of force touch and a touch force by each position, and also execute various corresponding applications.

Additionally, FIG. 1 shows that the electronic device corresponds to a smart phone, but not limited to this type. The electronic device may be any one among electronic notebook, electronic book (e-book), PMP (portable multimedia player), navigation, UMPC (ultra mobile PC), mobile phone, smart watch, table PC (personal computer), watch phone, mobile communication terminal, television, notebook, and monitor.

The panel moving part is prepared between the image display module and the housing plate in the electronic device so that it is possible to sense a user's touch force by sensing the change of mutual capacitance between the housing plate and the image display module which are spaced from each other with the panel moving part interposed in-between. Accordingly, the touch electrode for sensing the touch position is used to sense the touch force of the mutual capacitive type, whereby it is possible to reduce data processing time without an additional electrode channel, and also to sense the touch force for the touch pressure above the predetermined threshold value.

It will be apparent to those skilled in the art that various modifications and variations can be made to embodiments without departing from the scope of the disclosed embodiments. Thus, it is intended that the present invention covers the modifications and variations of this invention provided they come within the scope of the appended claims and their equivalents.

What is claimed is:

1. An electronic device having a force touch function comprising:
    an image display module having a touch electrode;
    a cover window attached to a front surface of the image display module;
    an electrically grounded housing for receiving the image display module therein, and supporting the cover window, the housing including a housing plate that covers a rear surface of the image display module;
    a panel moving part disposed between the housing plate and the image display module; and
    a driving circuit for operating in a first touch mode to sense a touch force based on a sensed mutual capacitance varying with distance between the touch electrode and the housing plate which are spaced from each other with the panel moving part interposed in-between, and the driving circuit operating in a second touch mode to sense a touch position based on a sensed self-capacitance of the touch electrode; and
    a host controller to control the image display module to drive display of an image during a display mode set in a first period of a first frame and a first period of a second frame, control the driving circuit to operate in the first touch mode during a second period of the first frame, and control the driving circuit to operate in the second touch mode during a second period of the second frame.

2. The electronic device according to claim 1, wherein the housing further includes a housing sidewall coupled to the housing plate, the housing sidewall covering a lateral surface of the image display module and supporting the cover window.

3. The electronic device according to claim 2, wherein the housing further includes an impact-absorbing member, which is disposed between the cover window and the housing sidewall, the impact-absorbing member for movably supporting the cover window.

4. The electronic device according to claim 1,
    wherein the image display module includes a display panel,
    wherein the display panel includes:
    a lower substrate including gate and data lines crossing each other, and a common electrode prepared in a pixel region defined by the gate and data lines; and
    an upper substrate bonded to the lower substrate with a liquid crystal layer interposed therebetween,
    wherein the common electrode comprises the touch electrode.

5. The electronic device according to claim 1, wherein the display panel includes a transparent conductive layer prepared on a rear surface of the lower substrate facing the housing plate, and the transparent conductive layer is electrically floating.

6. The electronic device according to claim 1, wherein the display panel includes:
    a lower substrate including gate and data lines crossing each other, and a common electrode prepared in a pixel region defined by the gate and data lines; and
    an upper substrate bonded to the lower substrate with a liquid crystal layer interposed therebetween,
    wherein a transparent conductive layer covers a rear surface of the lower substrate facing the housing plate and is connected with the driving circuit,
    the common electrode comprises the touch electrode for sensing the touch position, and
    the transparent conductive layer comprises a first touch force electrode for sensing the force touch.

7. The electronic device according to claim 6, wherein the transparent conductive layer includes a plurality of conductive patterns spaced at fixed intervals.

8. The electronic device according to claim 6,
    wherein the housing further includes a force electrode member prepared in the housing plate and connected with the driving circuit,
    wherein the force electrode member comprises a second touch force electrode for sensing the force touch.

9. The electronic device according to claim 8, wherein the driving circuit generates the force raw data by sensing the change of capacitance between the transparent conductive layer and the force electrode member in accordance with the change of distance between the transparent conductive layer and the force electrode member spaced from each other with the panel moving part interposed in-between, and
    wherein the force electrode member includes a single force electrode pattern or a plurality of force electrode patterns spaced at fixed intervals.

10. The electronic device according to claim 1, wherein the driving circuit generates touch driving signals having a same phase and a same potential difference and provides the generated touch driving signals to the gate line, the data line and the touch electrode, wherein the touch electrode provide touch position sensing data in response to the touch driving signal.

11. The electronic device according to claim 1, wherein the display panel includes:
a base substrate;
a back plate attached to a rear surface of the base substrate facing the housing plate;
a pixel array on the base substrate, the pixel array including a pixel having an organic light emitting device;
an encapsulation layer covering the pixel array; and
a touch panel attached to the encapsulation layer, the touch panel having the touch electrode.

12. The electronic device according to claim 1, wherein the display panel includes a conductive layer prepared on a rear surface of the back plate facing the housing plate, and the conductive layer is electrically floating.

13. An electronic device having a force touch function comprising:
an image display module;
a cover window attached to a front surface of the image display module;
a housing for receiving the image display module therein, and supporting the cover window, the housing including a housing plate that covers a rear surface of the image display module;
a base substrate;
a back plate attached to a rear surface of the base substrate facing the housing plate;
a pixel array on the base substrate, the pixel array including a pixel having an organic light emitting device;
an encapsulation layer for covering the pixel array;
a touch panel attached to the encapsulation layer, the touch panel having a touch electrode; and
a conductive layer on a rear surface of the back plate facing the housing plate, wherein the conductive layer comprises a touch force electrode, and includes a single conductive pattern or a plurality of conductive patterns spaced at fixed intervals;
a panel moving part disposed between the housing plate and the image display module; and
a driving circuit for operating in a first touch mode to sense a touch force based on a sensed mutual capacitance varying with distance between the touch force electrode and the housing plate which are spaced from each other with the panel moving part interposed in-between, and the driving circuit to operate in a second touch mode to sense a touch position based on a sensed self-capacitance of the touch electrode; and
a host controller to control the pixel array to drive display of an image during a display mode set in a first period of a first frame and a first period of a second frame, control the driving circuit to operate in the first touch mode during a second period of the first frame, and control the driving circuit to operate in the second touch mode during a second period of the second frame.

14. The electronic device according to claim 13, wherein the housing further includes a force electrode member in the housing plate and connected with the driving circuit, wherein the force electrode member comprises a second touch force electrode for sensing a force touch.

15. The electronic device according to claim 14, wherein the driving circuit senses the touch force by sensing the change of capacitance between the touch force electrode of the conductive layer and the force electrode member in accordance with the change of distance between the touch force electrode of the conductive layer and the force electrode member spaced from each other with the panel moving part interposed in-between,
wherein the force electrode member includes a single force electrode pattern or a plurality of force electrode patterns spaced at fixed intervals.

16. An electronic device for sensing a touch, the electronic device comprising:
an image display module comprising a display panel to display an image in response to an image signal, the image display module including a touch electrode and a transparent conductive layer below the touch electrode;
a cover window attached to the front surface of the image display module;
a housing comprising a housing plate covering a rear surface of the image display module and sidewalls covering lateral surfaces of the image display module and supporting the cover window, the housing supporting the image display module such that a gap exists between the housing plate and the rear surface of the image display module;
a touch driver circuit to sense a position of the touch based on a self-capacitance signal from the touch electrode;
a touch force circuit to sense a touch force of the touch based on a change in a mutual capacitance between the housing plate and the transparent conductive layer, the change in the mutual capacitance caused by a change in distance between the transparent conductive layer and the housing plate in response to the touch force and the touch force circuit to generate force data estimating the touch force applied to the image display module; and
a host controller to control the image display module to drive display of an image during a display mode set in a first period of a first frame and a first period of a second frame, control the touch driver circuit to sense the position of the touch during a second period of the first frame, and to control the touch force circuit to sense the touch force of the touch during a second period of the second frame.

17. The electronic device according to claim 16, wherein the transparent conductive layer is electrically floating, and wherein the housing plate is electrically grounded.

18. The electronic device according to claim 17, wherein the transparent conductive layer includes a plurality of conductive patterns spaced at first intervals.

19. The electronic device according to claim 18, wherein each of the plurality of conductive patterns comprises a bar shape having a length parallel to a first direction and are spaced at the first intervals along a second direction perpendicular to the first direction.

20. The electronic device according to claim 18, wherein each of the plurality of conductive patterns comprises has a length parallel to a first direction and are spaced at the first intervals along a second direction perpendicular to the first direction, wherein each of the plurality of conductive patterns comprises a plurality of pattern electrodes in a polygonal shape spaced at second intervals along the first direction, and bridge electrodes between each pair of neighboring pattern electrodes to connect the neighboring pattern electrodes.

21. The electronic device according to claim 17, wherein the housing plate comprises a force electrode member, wherein the touch driver circuit senses the mutual capacitance between the transparent conductive layer and the force electrode member.

22. The electronic device according to claim 21, wherein the transparent conductive layer comprises a plurality of conductive patterns spaced at first intervals and wherein the force electrode member comprises a uniform layer.

23. The electronic device according to claim 21,
wherein the transparent conductive layer comprises a first plurality of conductive patterns spaced at first intervals wherein each of the first plurality of conductive patterns has a length parallel to a first direction and are spaced at first intervals along a second direction perpendicular to the first direction, and
wherein the force electrode member includes a plurality of force electrode patterns spaced at first intervals wherein each of the plurality of force electrode patterns has a length parallel to the second direction and are spaced at second intervals along the first direction.

* * * * *